US007176962B2

(12) United States Patent
Ejima

(10) Patent No.: US 7,176,962 B2
(45) Date of Patent: Feb. 13, 2007

(54) DIGITAL CAMERA AND DIGITAL PROCESSING SYSTEM FOR CORRECTING MOTION BLUR USING SPATIAL FREQUENCY

(75) Inventor: Satoshi Ejima, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 565 days.

(21) Appl. No.: 10/083,146

(22) Filed: Feb. 27, 2002

(65) Prior Publication Data
US 2002/0122133 A1 Sep. 5, 2002

(30) Foreign Application Priority Data
Mar. 1, 2001 (JP) .............................. 2001-056096
Apr. 5, 2001 (JP) .............................. 2001-107429

(51) Int. Cl.
*H04N 5/228* (2006.01)
(52) U.S. Cl. ............................... 348/208.4; 348/221.1; 348/208.12
(58) Field of Classification Search ............. 348/208.4, 348/221.1, 362, 241, 208.1, 208.12, 208.13; 396/54, 55
See application file for complete search history.

(56) References Cited

U.S. PATENT DOCUMENTS

| 5,420,635 | A | * | 5/1995 | Konishi et al. ............. 348/362 |
| 5,430,480 | A | * | 7/1995 | Allen et al. ............... 348/208.4 |
| 6,037,972 | A | * | 3/2000 | Horiuchi et al. ............ 348/64 |
| 6,040,860 | A | * | 3/2000 | Tamura et al. ............. 348/252 |
| 6,496,226 | B2 | * | 12/2002 | Takahashi et al. .......... 348/362 |
| 6,628,711 | B1 | * | 9/2003 | Mathew et al. ........ 375/240.12 |
| 6,778,210 | B1 | * | 8/2004 | Sugahara et al. ........ 348/208.4 |
| 2002/0044772 | A1 | * | 4/2002 | Yamasaki et al. ........... 396/104 |

* cited by examiner

*Primary Examiner*—Ngoc-Yen Vu
*Assistant Examiner*—Anthony J. Daniels
(74) *Attorney, Agent, or Firm*—Oliff & Berridge, PLC

(57) ABSTRACT

First image data and second image data are generated by capturing a subject image at a CCD. The first image data captured over a first exposure time manifest a relatively small extent of image blur. The second image data are captured over a second exposure time set longer than the first exposure time. A spatial frequency analysis is implemented on the first image data and the second image data to calculate the amplitude ratio and the phase difference of the high-frequency components in the two sets of image data. Based upon the amplitude ratio and the phase difference of the high-frequency components thus calculated, the spatial frequency component of the second image data is corrected to generate third image data in which any image blur has been corrected.

29 Claims, 16 Drawing Sheets

IMAGE 1: D1 (x, y)
IMAGE 2: D2 (x, y)

x  x+1 x+2 x+3 x+4 x+5 x+6 x+7 y
y+1
y+2
y+3
y+4
y+5
y+6
y+7

IMAGE 1: A1 (fx, fy),  P1 (fx, fy)
IMAGE 2: A2 (fx, fy),  P2 (fx, fy)

1  2  3  4  ← fx 1
2
3
4

↑
fy

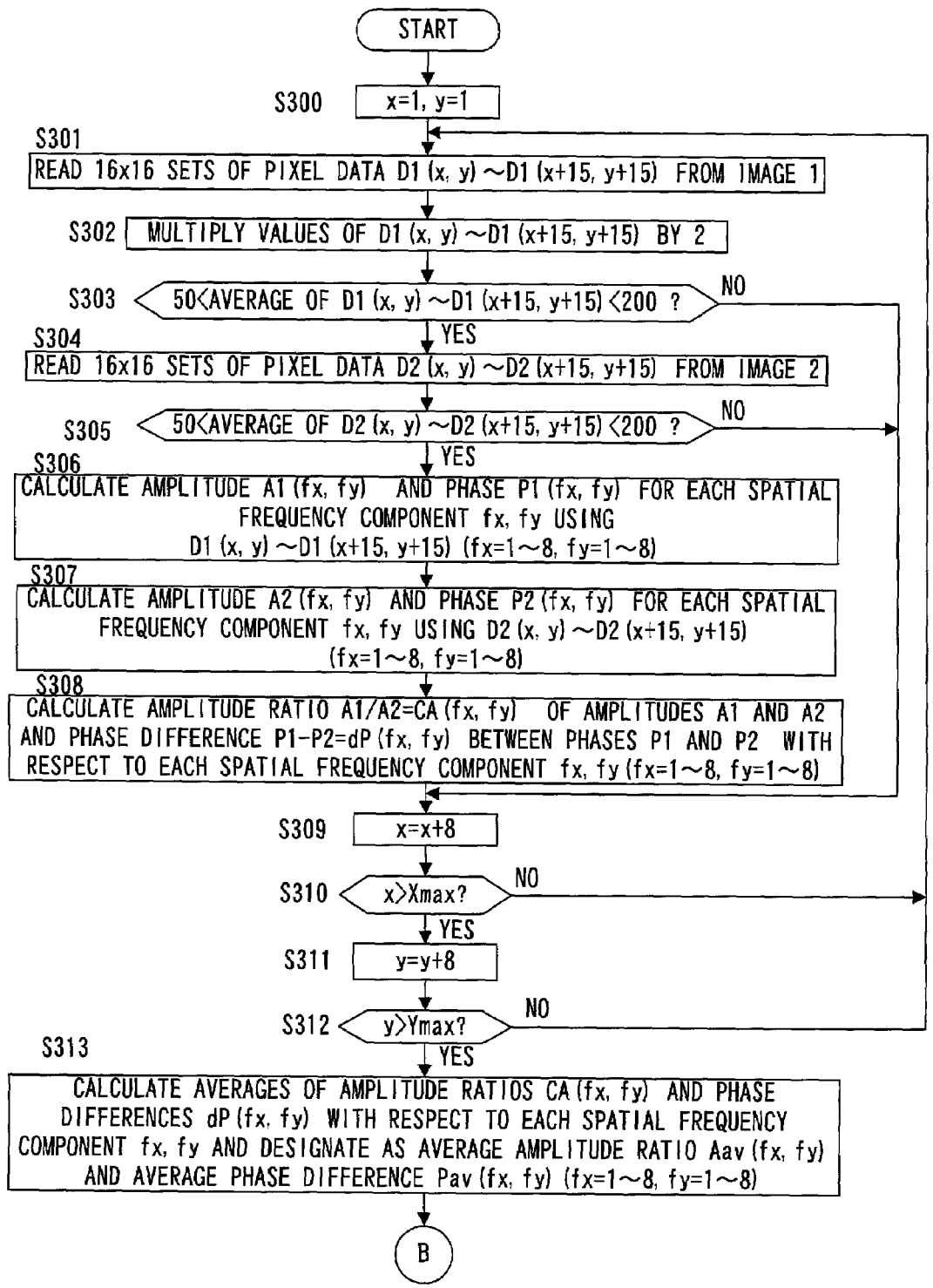

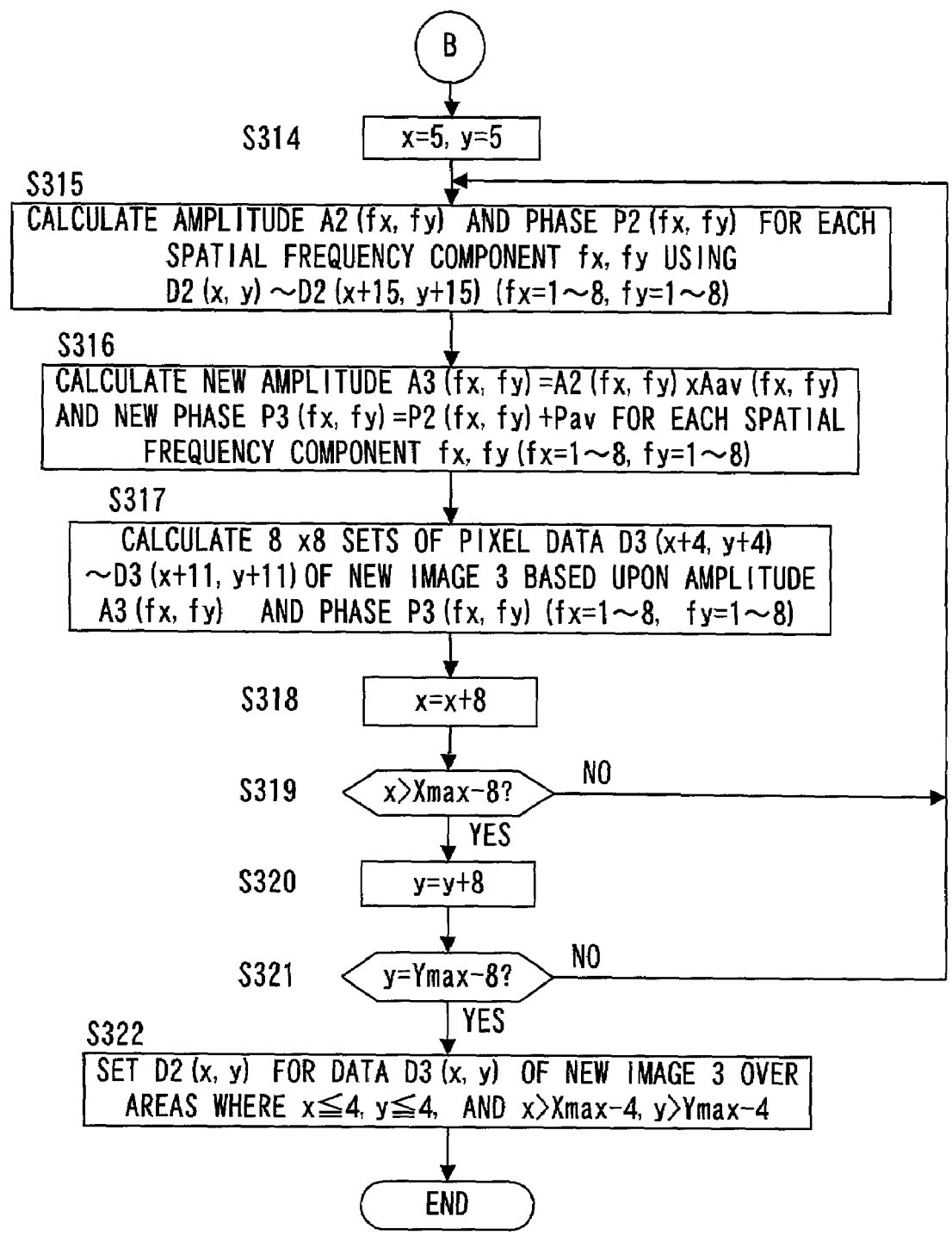

DIGITAL CAMERA AND DIGITAL PROCESSING SYSTEM FOR CORRECTING MOTION BLUR USING SPATIAL FREQUENCY

INCORPORATION BY REFERENCE

The disclosures of the following priority applications are herein incorporated by reference:
Japanese Patent Application No. 2001-056096 filed Mar. 1, 2001
Japanese Patent Application No. 2001-107429 filed Apr. 5, 2001

BACKGROUND OF THE INVENTION

1. Field of the Invention

The present invention relates to a digital camera and an image processing system, and more specifically, it relates to a technology that may be adopted to generate an image by correcting an image blur.

2. Description of Related Art

The following methods have been proposed in the related art to be adopted in a camera to correct an image blur.

(1) A blur correction optical system is internally provided in the photographic optical system of the camera and a movement of the camera caused by an unsteady hand is detected with a movement detector. In correspondence to the detected camera movement, the blur correction optical system is moved during an image-capturing operation. Thus, the occurrence of an image blur caused by the camera movement is prevented.

(2) A movement of the camera caused by an unsteady hand is detected with a movement detector and recorded during an image-capturing operation. Based upon the movement information that has been recorded, the captured image is processed. Through this process, the image manifesting a blur is corrected.

(3) A plurality of images is continuously captured and changes manifesting in the plurality of images are detected through pattern matching or the like. The plurality of images are synthesized based upon the changes in the images that have been detected to generate an image in which any image blur is corrected.

However, the first method described above requires the movement detector for detecting movements of the camera caused by an unsteady hand and a mechanical moving system for moving the blur correction optical system in order to correct the resulting blur, giving rise to problems such as an increase in the size of the camera and an increase in the production costs.

In addition, an image blur resulting from a movement of the subject during the exposure operation cannot be corrected through the first and second methods in which a movement of the camera is detected with the movement detector and the image blur is corrected based upon the detection results. While blurring manifesting in a plurality of images can be corrected through the third method, an image blur occurring as a single image is being exposed cannot be corrected through this method.

SUMMARY OF THE INVENTION

An object of the present invention is to provide a digital camera and an image processing system that make it possible to correct an image blur occurring during an exposure operation as necessary with a high degree of efficiency without requiring a movement detector or a blur correction optical system.

In order to achieve the object described above, a digital camera comprises an image-capturing device that captures a subject image, an exposure control device that implements control on a length of exposure time to elapse while capturing the subject image at said image-capturing device, an image generating device that generates a plurality of sets of image data through successive image-capturing operations performed over varying exposure times by controlling said image-capturing device and said exposure control device and an image processing device that generates image data in which the blur has been corrected by implementing image processing based upon the plurality of sets of image data generated by said image generating device.

In order to achieve the object described above, an image processing system comprises a digital camera having an image-capturing device that captures a subject image, an exposure control device that controls the length of exposure time to elapse while capturing the subject image at said image-capturing device and an image generating device that engages said exposure control device and said image-capturing device to successively generate first image data by capturing an image over a first exposure time and second image data by capturing an image over a second exposure time set longer than the first exposure time, and an image processing apparatus that generates third image data by correcting at least a high-frequency component of a spatial frequency contained in the second image data based upon the first image data and the second image data generated by said digital camera.

Moreover, in order to achieve the object described above, an image processing system comprises a digital camera having an image-capturing device that captures a subject image, an exposure control device that controls the length of exposure time to elapse while capturing the subject image at said image-capturing device and an image generating device that engages said exposure control device and said image-capturing device to successively generate first image data by capturing an image over a first exposure time and second image data by capturing an image over a second exposure time set longer than the first exposure time, and an image processing apparatus that detects a panning direction along which the second image data have been captured and generates third image data by correcting a spatial frequency component contained in the second image data in correspondence to the panning direction based upon the first image data and the second image data generated by said digital camera.

In order to achieve the object described above, a digital camera comprises an image-capturing device that captures a subject image, an exposure control device that implements control on a length of exposure time to elapse while capturing the subject image at said image-capturing device, an image generating device that successively generates first image data by capturing an image over a first exposure time and second image data by capturing an image over a second exposure time set longer than the first exposure time, an image processing device that generates third image data in which a blur is corrected by correcting at least a high-frequency component of a spatial frequency contained in the second image data based upon the first image data and the second image data generated by said image generating device, an image compression device that compresses the first image data at a first compression rate and compresses the second image data at a second compression rate higher than the first compression rate, a recording device that records the first image data and the second image data having been compressed at said image compression device into a recording medium, and a display control device that allows the second image data to be displayed at a display unit and disallows display of the first image data at the display unit. The exposure control device implements control so that the second exposure time is set to a length of time over which a correct exposure quantity that sets brightness of the image data to a correct level is achieved and so that the first exposure time is set equal to or less than approximately ½ of the second exposure time. The image processing device divides both the first image data and the second image data into pixel data blocks each containing pixel data corresponding to a predetermined number of pixels, calculates an amplitude ratio and a phase difference of a spatial frequency component of the first image data and the spatial frequency component of the second image data in each pixel data block, calculates an average amplitude ratio and an average phase difference of the spatial frequency components of the first image data and the second image data by averaging amplitude ratios and phase differences of the spatial frequency components in individual pixel data blocks that have been calculated and generates the third image data by correcting the amplitude and the phase of the spatial frequency component of the second image data based upon the average amplitude ratio and the average phase difference thus calculated.

Further, in order to achieve the object described above, a digital camera comprises an image-capturing device that captures a subject image, an exposure control device that implements control on a length of exposure time to elapse while capturing the subject image at said image-capturing device, an image generating device that successively generates first image data by capturing an image over a first exposure time and second image data by capturing an image over a second exposure time set longer than the first exposure time, an image processing device that generates third image data in which a blur is corrected by correcting at least a high-frequency component of a spatial frequency contained in the second image data based upon the first image data and the second image data generated by said image generating device, an image compression device that compresses the first image data at a first compression rate and compresses the second image data at a second compression rate higher than the first compression rate, a display control device that allows the second image data to be displayed at a display unit and disallows display of the first image data at the display unit, and a blur detection device that detects the blur manifesting in the second image data based upon the first image data and the second image data generated at said image generating device. The exposure control device implements control so that the second exposure time is set to a length of time over which a correct exposure quantity that sets brightness of the image data to a correct level is achieved and so that the first exposure time is set equal to or less than approximately ½ of the second exposure time. The image processing device records the second image data into a recording medium without implementing image processing for blur correction if detection results obtained at said blur detection device indicate that the second image data do not manifest any blur, whereas said image processing device divides both the first image data and the second image data into pixel each containing pixel data corresponding to a predetermined number of pixels, calculates an amplitude ratio and a phase difference of the spatial frequency component of the first image data and the spatial frequency component of the second image data in each pixel data block, calculates an average amplitude ratio and an average phase difference of the spatial frequency components of the first image data and the second image data by averaging amplitude ratios and phase differences of spatial frequency components in individual pixel data blocks that have been calculated, generates the third image data by correcting the amplitude and the phase of the spatial frequency component of the second image data based upon the average amplitude ratio and the average phase difference thus calculated and records the third image data obtained by correcting the blur into the recording medium.

BRIEF DESCRIPTION OF THE DRAWINGS

FIG. 9 presents a flowchart of a blurred image correction processing procedure;

FIG. 10 presents a flowchart of the blurred image correction processing procedure;

DESCRIPTION OF THE PREFERRED EMBODIMENTS

-First Embodiment-

The digital camera achieved in the first embodiment of the present invention is explained in reference to the drawings.

Figure 1:
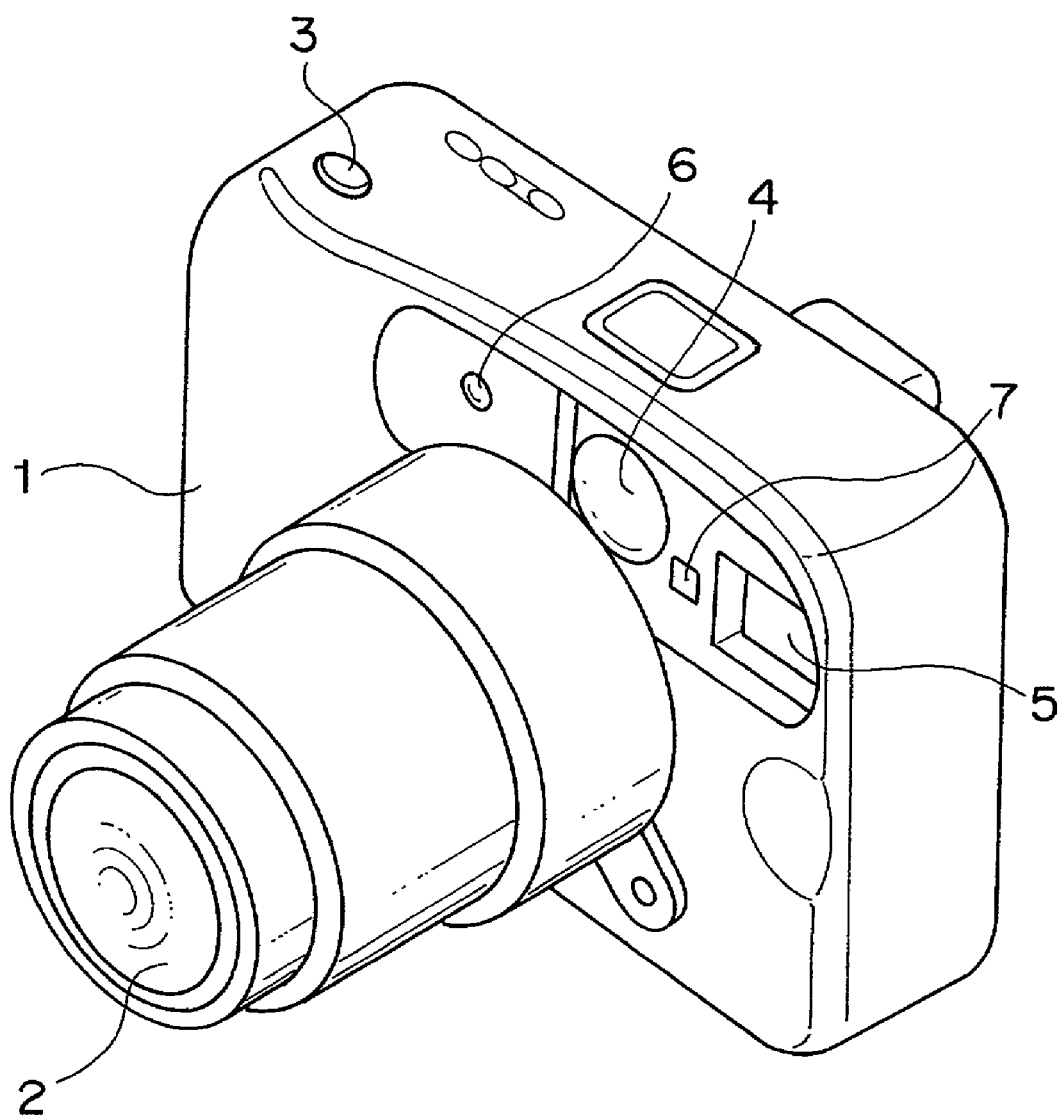
FIG. 1 is a perspective taken from the front, showing the structure of the digital camera achieved in an embodiment of the present invention.
Figure 2:
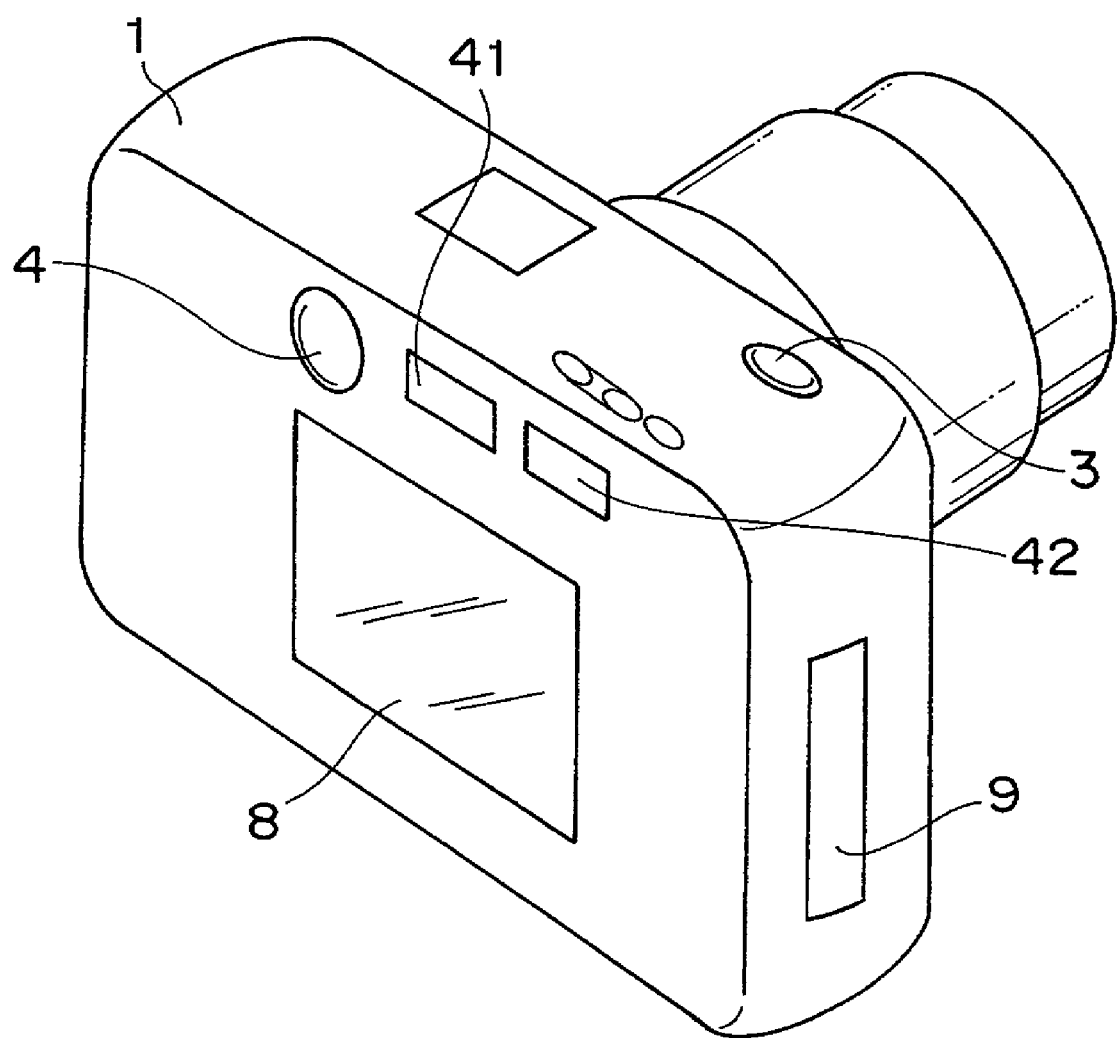
FIG. 2 is a perspective taken from the rear, showing the structure of the digital camera achieved in the embodiment of the present invention.

FIGS. 1 and 2 present perspectives of the external appearance of a digital camera 1 in the first embodiment of the present invention.

FIG. 1 is a perspective of the digital camera 1 viewed from the front. At the front surface of the digital camera 1, a photographic lens 2 that forms a subject image, a view finder 4 used when checking the subject photographing range, a light emitting unit (strobe) 5 that emits flash light to illuminate the subject during a photographing operation, a colorimetering element 6 that measures the color of the subject, a photometering element 7 that measures the brightness of the subject and the like are provided. At the top surface of the digital camera 1, a shutter release button 3 which is operated by the photographer when photographing the subject is provided.

FIG. 2 is a perspective of the digital camera 1 viewed from the rear. At the rear side of the digital camera 1, an eyepiece unit of the viewfinder 4, a display unit (display LCD) 8 at which the captured image is displayed, a panning direction setting member 41 operated by the photographer to set the direction along which a panning operation is to be performed and a blur correction selecting member 42 operated by the photographer to indicate whether or not a blur correction is to be implemented are provided. At a side surface of the digital camera 1, a memory card slot 9, at which a removable storage medium (memory card) for recording information of captured images (image data) is loaded, is provided.

Figure 3:
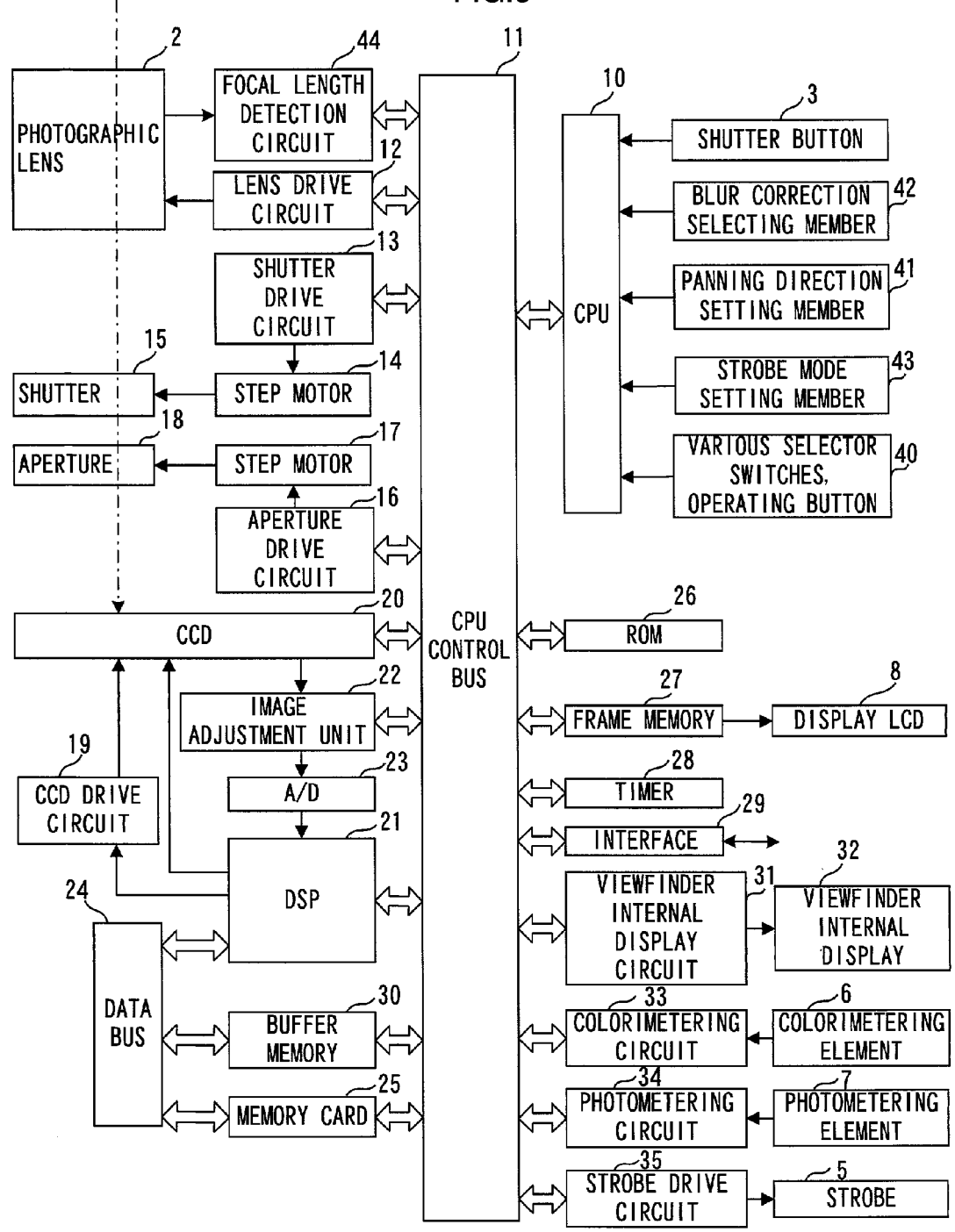
FIG. 3 is a block diagram showing the electrical structure assumed in the digital camera in the embodiment of the present invention.

FIG. 3 is a block diagram showing the electrical structure assumed in the digital camera 1.

A CPU 10 controls the overall operation of the digital camera 1 by implementing control on the individual units connected to a CPU control bus 11 based upon a control program stored in a ROM 26. The image blur correction processing according to the present invention is executed by the CPU 10. Details of the image blur correction processing are to be provided later.

An image of a subject image light flux having passed through the photographic lens 2, a shutter 15 and an aperture 18 is captured at a CCD 20. The CCD 20, which includes a plurality of pixels, performs photoelectric conversion to convert optical images formed at the pixels to image signals (electric signals).

An image adjustment unit 22 samples the image signals resulting from the photoelectric conversion performed at the CCD 20 with predetermined timing and amplifies the sampled signals to a predetermined level. The image adjustment unit 22 is controlled by the CPU 10.

An analog/digital conversion circuit (AD conversion circuit) 23 quantizes (digitizes) the image signal sampled at the image adjustment unit 22 at a predetermined number of bits (e.g., 8 bits) and provides the quantized image signals to a digital signal processor (DSP) 21 as image data.

The DSP 21 supplies a CCD horizontal drive pulse to the CCD 20 and also controls a CCD drive circuit 19 so as to supply a CCD vertical drive pulse to the CCD 20 in response to an operation command which is issued by the CPU 10 when the shutter release button 3 is operated.

The DSP 21 implements control on a data bus 24 connected to a buffer memory 30 and a memory card 25. The image data provided by the A/D conversion circuit 23 are compressed and then temporarily stored in the buffer memory 30. The DSP 21 reads out the image data stored in the buffer memory 30 and records the image data into the memory card 25.

The DSP 21 reads out the image data from the buffer memory 30 or the memory card 25 and decompresses the image data. The decompressed image data are stored in a frame memory 27 and are displayed at the display LCD 8. The DSP 21 implements timing management for the data input/output when image data are recorded into the memory card 25, when image data are stored into the buffer memory 30 and the like. The buffer memory 30 is utilized in order to lessen the difference between the data input/output speed at the memory card 25 and the processing speed at the CPU 10, the DSP 21 and the like.

In addition, the DSP 21 performs image processing for correcting a blurred image as detailed later.

The shutter release button 3 outputs signals corresponding to three operating states, i.e., a non-operating state, a half press state and a full press state, to the CPU 10. In response to an input of a full press signal from the shutter release button 3, the CPU 10 sends an image-capturing command to the DSP 21 to prompt the DSP 21 to execute the image-capturing operation described above.

The photometering element 7 measures the quantities of light from the subject and from the periphery of the subject and outputs the results of the measurement to a photometering circuit 34. The photometering circuit 34 first implements a specific type of processing on an analog signal indicating the results of the photometering operation provided by the photometering element 7 and then converts the analog signal to a digital signal, thereby generating photometering data. The photometering data thus generated are output to the CPU 10.

The colorimetering element 6 measures the color temperatures of the subject and at the periphery of the subject and outputs the results of the measurement to a colorimetering circuit 33. The colorimetering circuit 33 first implements a specific type of processing on an analog signal indicating the results of the colorimetering operation provided by the colorimetering element 6 and then converts the analog signal to a digital signal, thereby generating colorimetering data. The colorimetering data thus generated are output to the CPU 10.

A timer 28, which is internally provided with a clock circuit, outputs time data indicating the current time point to the CPU 10.

A shutter drive circuit 13 drives the shutter 15 by controlling a step motor 14. The length of time over which an exposure operation is performed at the CCD 20 is controlled by controlling the shutter speed. The shutter 15 is provided between the photographic lens 2 and the CCD 20 to block the light entering the CCD 20 from the photographic lens 2 or to allow light to be transmitted.

An aperture drive circuit 16 sets the opening diameter at the aperture 18 to a specific value by driving a step motor 17. The aperture 18, which is provided between the photographic lens 2 and the CCD 20, adjusts the diameter of the opening through which light entering the CCD 20 from the photographic lens 2 is allowed to pass through.

The CPU 10 determines the aperture value data for the aperture 18 and the shutter speed (exposure time) data for the shutter 15 so that the brightness value of the image data obtained through the image-capturing operation at the CCD 20 achieves a correct level by referencing the photometering data input from the photometering circuit 34 and a specific table. The aperture value data and the shutter speed data thus determined are respectively provided to the aperture drive circuit 16 and the shutter drive circuit 13.

The CPU 10 causes the strobe unit 5 to emit light as necessary by controlling a strobe drive circuit 35 during a photographing operation if the brightness level of the subject is equal to or lower than a predetermined value, based upon the photometering data.

The CPU 10 references a specific table and calculates a white balance adjustment value corresponding to the colorimetering data (the color temperature) input from the colorimetering circuit 33. The white balance adjustment value thus calculated is provided to the image adjustment unit 22.

Based upon the time data provided by the timer 28, the CPU 10 records the information indicating the photographing data and the file name as image data header information into a photographic image recording area of the memory card 25.

The CPU 10 moves the photographic lens 2 by controlling the lens drive circuit 12 and thus executes an autofocus operation. The CPU 10 read out data indicating the focal length of the photographic lens 2 via a focal length detection circuit 44. The CPU 10 displays statuses of individual operations and the like at a viewfinder internal display LCD 32 by controlling a viewfinder internal display circuit 31.

The CPU 10 is capable of exchanging specific types of data with an external apparatus (not shown) such as a personal computer via an interface 29.

The CPU 10 processes signals received from various selector switches and operating buttons 40 as appropriate. The various selector switches and operating buttons 40 include a selector switch which is operated by the user in order to select an operation mode (macro mode) optimized for a close-up photographing operation. The CPU 10 moves the photographic lens 2 to set the optical system at a position suitable for a close-up photographing operation by controlling the lens drive circuit 12 when the macro mode is selected.

In addition, the CPU 10 implements control on the CCD 20 and the shutter drive circuit 13 to generate images through varying exposure times as detailed later in order to correct a blurred image.

A blur correction selecting member 42 operated by the user outputs a signal indicating its operating state to the CPU 10.

If the blur correction selecting member 42 is operated to indicate that a blur correction is to be implemented, the CPU 10 executes blur correction processing which is to be detailed later on image information (image data) stored in the buffer memory 30 in response to the signal from the blur correction selecting member 42.

The panning direction setting member 41 operated by the user outputs a signal indicating its operating state to the CPU 10. The CPU 10 selects the right type of image blur correction processing to be executed on the image information (image data) stored in the buffer memory 30 as explained later in correspondence to the operating state of the panning direction setting member 41. An explanation is given in reference to the first embodiment on an image blur correction implemented during a photographing operation performed without panning the camera. It is to be noted that the term "panning" refers to a method of photographing performed to photograph a main subject moving against the background by moving the camera so as to follow the movement of the subject during the exposure, in order to prevent the subject image from becoming blurred due to the movement of the main subject during the exposure. The settings of the panning direction setting member 41 include three states, i.e., no panning, panning along the horizontal direction within the image plane and panning along the vertical direction within the image plane.

A strobe mode setting member 43 is operated by the user in order to set an operation mode (strobe mode) for performing a photographing operation by emitting light at the strobe unit 5. The strobe mode setting member 43 outputs a signal indicating its operating state to the CPU 10. The strobe mode may include, for instance, a normal mode and a slow synchronize mode. In the normal mode the CPU 10 automatically induces light emission at the strobe unit 5 during the photographing operation if the photometering data output by the photometering element 7 indicates a brightness level lower than a predetermined value. At this time, restrictions are imposed with regard to the shutter speed so that it is set equal to or lower than the shutter speed limit at which the shutter can be fully released (e.g., $\frac{1}{60}$ sec) and equal to or higher than the shutter speed at which no image blur is allowed to occur (e.g., 1/f with f(mm) representing the focal length of the photographic lens 2 in a 35 mm silver halide camera conversion). In the slow synchronize mode, on the other hand, no limit is set with regard to the shutter speed on the lower side for the flash photographing operation so that the photographing operation is performed by implementing flash illumination to achieve an image which retains the atmosphere of the background.

Figure 4:
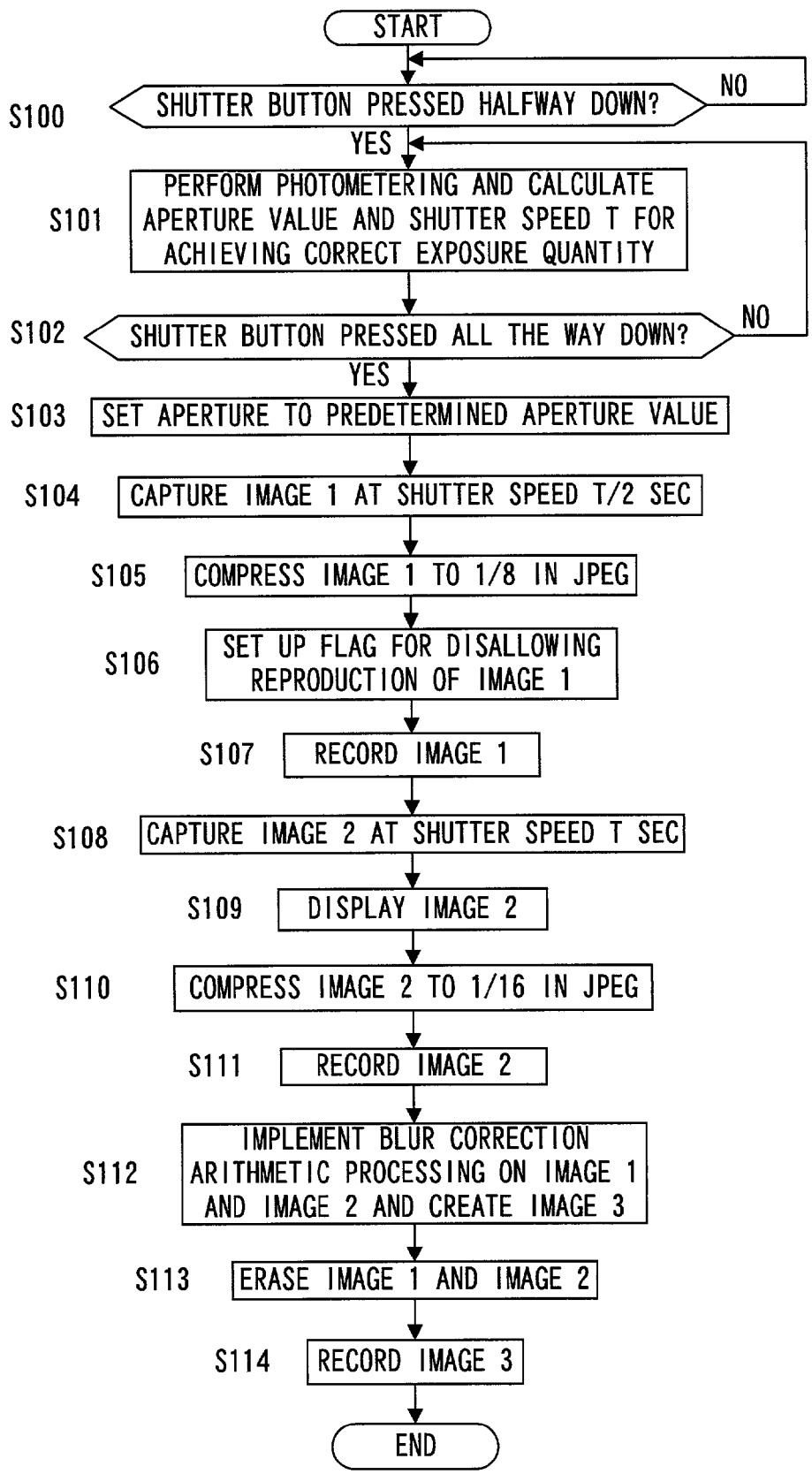
FIG. 4 presents a flowchart of the processing implemented in conformance to a blurred image correction processing program in the CPU and the DSP in a first embodiment of the present invention.

FIG. 4 presents a flowchart of the procedure of the image blur correction control processing achieved in the first embodiment of the present invention. It is to be noted that the image blur correction selecting member 42 is set to indicate that an image blur correction is to be executed, the panning direction setting member 41 is set to indicate that the photographing operation is to be performed without panning the camera and the strobe mode setting member 43 is set to the normal mode in the first embodiment. In addition, it is assumed that the subject achieves a high brightness level and thus no light is to be emitted at the strobe unit 5. This processing, which is executed by the CPU 10 and the DSP 21, starts as the power to the digital camera 1 is turned on.

In step S100, it is judged as to whether or not the shutter release button 3 has been pressed halfway down. If an affirmative judgement is made in step S100 that the shutter release button 3 has been pressed halfway down, the operation proceeds to step S101. In step S101, photometering data are generated at the photometering circuit 34 based upon the brightness of the subject measured by the photometering element 7. In addition, the aperture value and the exposure time (shutter speed) T sec for achieving a correct exposure quantity which will achieve a correct image data brightness level when capturing an image of the subject with the CCD 20 are calculated based upon the photometering data.

In step S102, it is judged as to whether or not the shutter release button 3 has been pressed all the way down. If an affirmative judgement is made in step S102, the operation proceeds to step S103. If, on the other hand, a negative judgement is made in step S102, the operation returns to step S101. In step S103, an instruction is issued to the aperture drive circuit 16 to drive the step motor 17 so that the aperture 18 is controlled to achieve the aperture value calculated in step S101. In step S104, an instruction is issued to the shutter drive circuit 13 to set an exposure time (shutter speed) T/2 sec which is half the exposure time T sec calculated in step S101. The shutter drive circuit 13 engages the shutter 15 in operation by driving the step motor 14 so that the CCD 20 captures a subject image through exposure performed over the exposure time T/2 sec. The image thus obtained is referred to as image 1. The electrical charges stored at the CCD 20 are transferred to the DSP 21 via the image adjustment unit 22 and the A/D conversion circuit 23.

Image 1, which has been exposed over the exposure time T/2 sec, has not been exposed to a large extent. However, it does not manifest a significant image blur attributable to an unsteady movement of the camera and the spatial frequency of image 1 contains a great deal of high-frequency component. In step S105, image 1 undergoes JPEG compression at a rate of ⅛. It is to be noted that ⅛ JPEG compression only induces a relatively small degree of deterioration of the high-frequency component in the spatial frequency. In step S106, 1 is recorded at a flag for disallowing reproduction in order to disallow reproduction of image 1 having been exposed to a small extent, i.e., in order to disallow display of image 1 at the display LCD 8. As a result, image 1, which has not been fully exposed and is consequently dark, is not allowed to be displayed at the display LCD 8. In step S107, the compressed image 1 is recorded into the buffer memory 30.

In step S108, a subject image is captured at the CCD 20 at the aperture value and the exposure time T calculated in step S101. The image captured at this time is referred to as image 2. Image 2 is provided to the DSP 21 as was image 1. In step S109, image 2 having been captured at the correct exposure quantity is displayed at the display LCD 8. Since image 2 achieving a correct brightness level is displayed instead of the dark image 1, the user is able to verify that the exposure has been implemented at the correct exposure quantity.

In step S110, image 2 undergoes JPEG compression at a rate of 1/16. Since the high-frequency component in the spatial frequency in image 2 has been lost due to an unsteady hand movement, the quality of the image having undergone the 1/16 JPEG compression does not deteriorate greatly. In step S111, the compressed image 2 is recorded into the buffer memory 30. Image 1 containing a great deal of high-frequency component in the spatial frequency is compressed at a low compression rate, whereas image 2 which does not contain much high-frequency component is compressed at a higher compression rate. As a result, the buffer memory 30 is utilized with a high degree of efficiency.

In step S112, an image 3 without blur is created using image 1 and image 2. The image processing executed in step S112 is to be detailed later.

In step S113, image 1 and image 2 are erased from the buffer memory 30. In step S114, image 3 created in step S112 is recorded into the memory card 25. Thus, the basic sequence ends in the camera.

Figure 5:
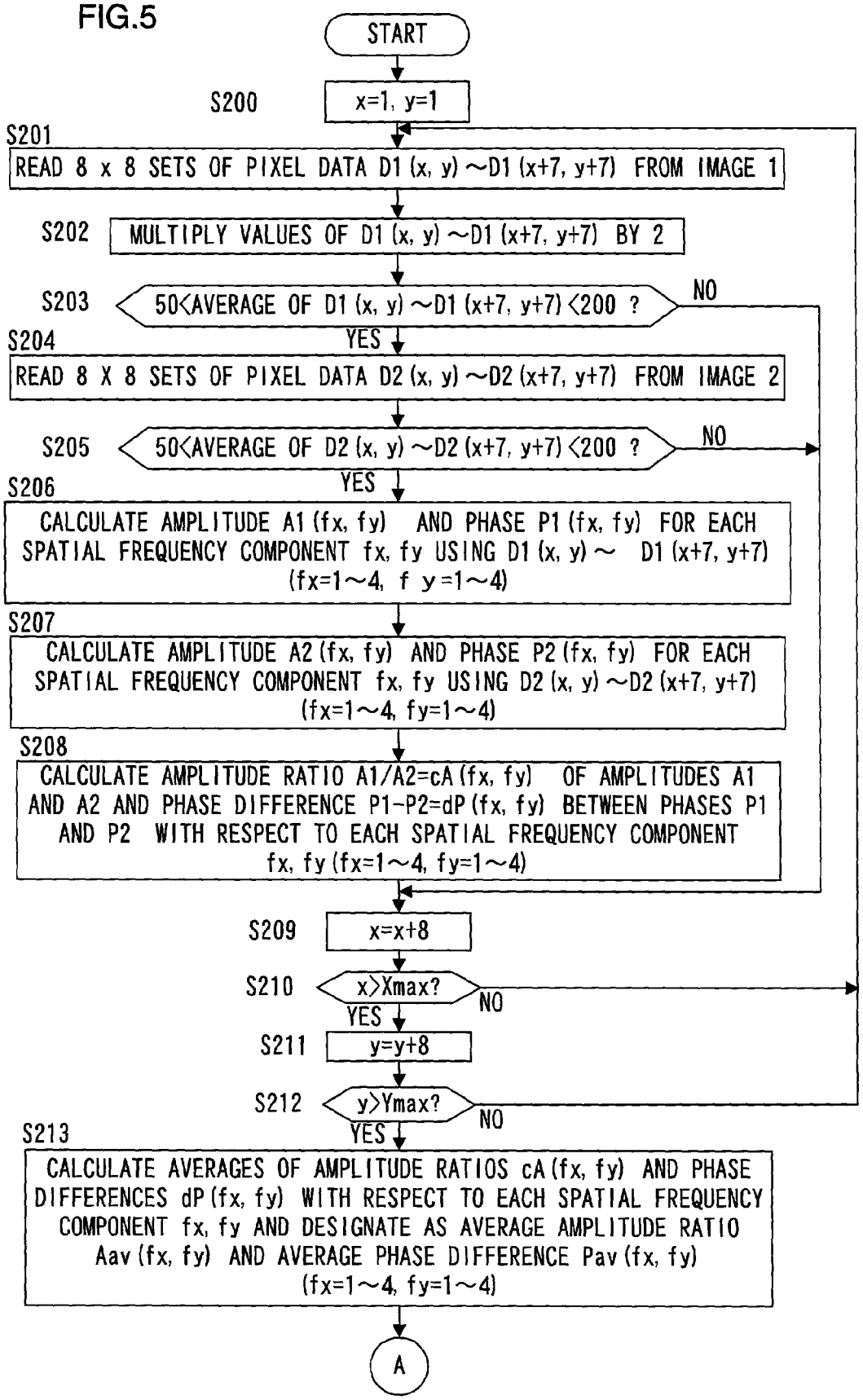
FIG. 5 is a flowchart of the blurred image correction processing procedure.
Figure 6:
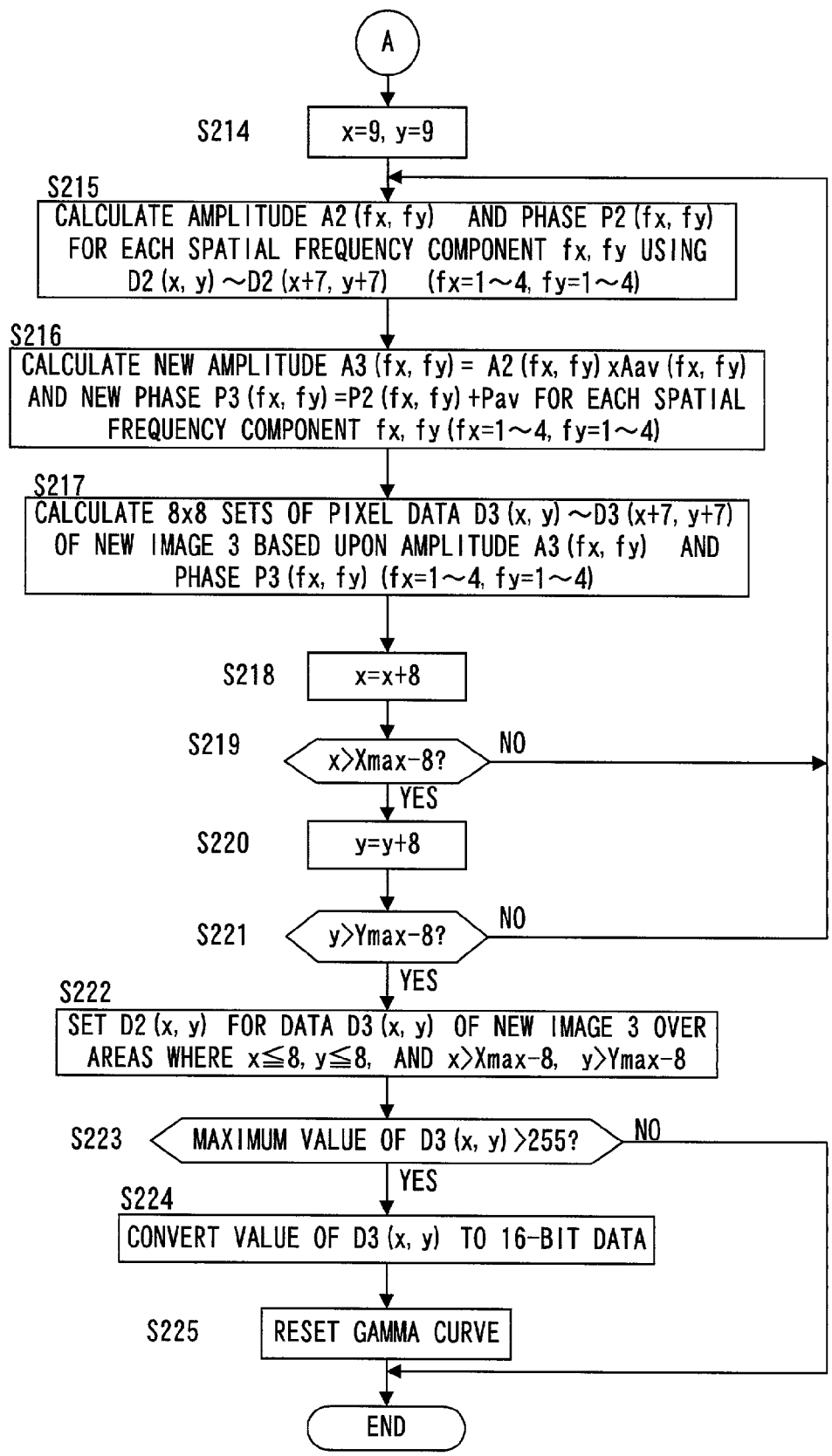
FIG. 6 is a flowchart of the blurred image correction processing procedure.

Next, the blurred image correction processing performed in step S112 in the flowchart presented in FIG. 4 described above, i.e., the creation of image 3, is explained in reference to the flowchart in FIGS. 5 and 6. It is to be noted that the blurred image correction processing explained below in reference to FIGS. 5 and 6 is executed at the DSP 21.

Figure 7:
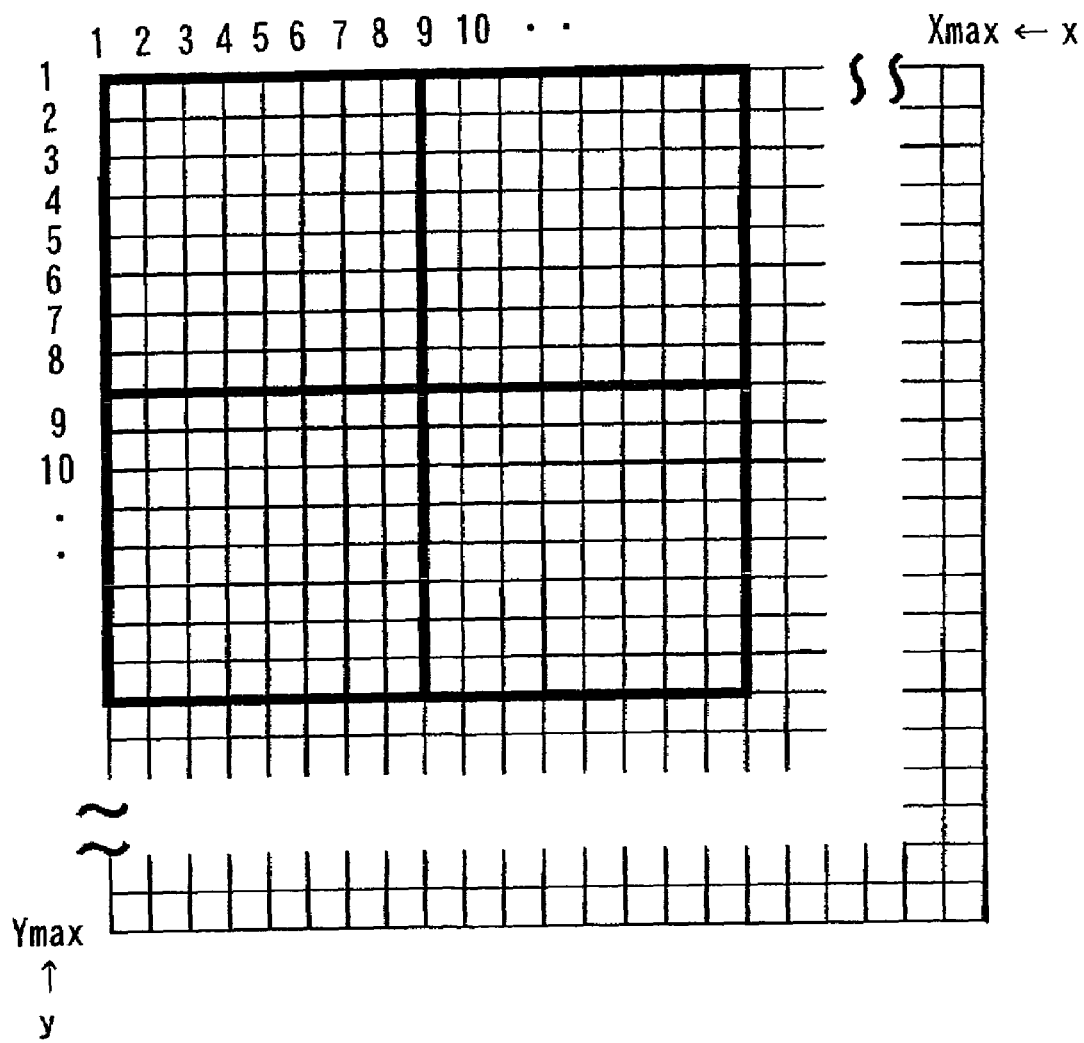
FIG. 7 shows the structure of the image data.

As shown in FIG. 7, image 1 and image 2 are constituted of matrix data respectively represented as data D1(x, y) and data D2(x, y). The maximum value of x is Xmax, whereas the maximum value of y is Ymax. It is to be noted that x represents the horizontal direction (x direction) and y represents the vertical direction (Y direction) in the figure. Image 1 and image 2 are each constituted of data in a spatial coordinate system obtained by decompressing the compressed data stored in the buffer memory 30. While image 1 and image 2 contain color information in addition to the brightness information, the following explanation is given by regarding them as brightness information only for purposes of simplification. It is to be noted that the following explanation are given by assuming that image 1 and image 2 are each constituted of data having been quantized to 8 bits with the black level at 0 and the white level at 255.

In step S200, coordinate parameters x and y used to indicate the positions of the individual pixels in the data D1 corresponding to image 1 and the data D2 corresponding to the image 2 are initialized to 1.

In step S201, image data D1(x, y)~D1(x+7, y+7) in a pixel data block corresponding to 8×8 pixels are read out from image 1. In step S202, the image data D1(x, y)~D1(x+7, y+7) read out in step S201 are individually multiplied by 2, since the exposure quantity for image 1 was half (T/2) the correct value. It is to be noted that even if any of values obtained by multiplying the data by 2 in step S202 is equal to or higher than 256, the information is held intact, as the data of image 1 obtained over a short exposure time need to be referenced when processing areas where white-clippings occur.

In step S203, it is judged as to whether not the image data D1(x, y)~D1(x+7, y+7) of image 1 manifest any white-clippings or black-clippings. In step S203, it is judged that a black-clipping has manifested if the average value of the image data D1(x, y)~D1(x+7, y+7) is equal to or lower than 50 and it is judged that a white-clipping has manifested if the average value is equal to or higher than 200. If it is judged in step S203 that no white-clipping or black-clipping has manifested, i.e., if the average value of the image data D1(x, y)~D1(x+7, y+7) is larger than 50 and smaller than 200, the operation proceeds to step S204.

In step S204, image data D2(x, y)~D2(x+7, y+7) in a pixel data block corresponding to 8×8 pixels are read from image 2. In step S205, it is judged as in step S203 as to whether or not the image data D2(x, y)~D2(x+7, y+7) image 2 manifest a white-clipping or a black-clipping. If it is judged in step S205 that no white-clipping or black-clipping has manifested, the operation proceeds to step S206.

If, on the other hand, it is judged that the data manifest a white-clipping or a black-clipping in step S203 or step S205, the operation proceeds to step S209 in order to ensure that the area manifesting the white-clipping or the black-clipping is not included in the image processing, i.e., the image blur correction processing, to be implemented on image 1 and image 2.

Figures 8A, 8B:
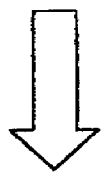
FIG. 8A shows the block structure of the image data.
FIG. 8B shows the block structure of the amplitude data and the phase data.

In step S206, the image data block D1(x, y)~D1(x+7, y+7) over 8 pixels (down)×8 pixels (across) of image 1 shown in FIG. 8A undergoes a spatial frequency analysis through a Fourier transform. As a result, four different sets of spatial frequencies fx, fy(fx=1~4, fy=1~4) representing 8-pixel~2-pixel periods are obtained along both the vertical and horizontal directions as shown in FIG. 8B. Then, the amplitude A1(fx, fy) and the phase P1(fx, fy) of each spatial frequency fx, fy are calculated.

step S207, a spatial frequency analysis similar to that executed in step S206 is implemented on the image data block D2(x, y)~D2(x+7, y+7) of image 2, and the amplitude A2(fx, fy) and the phase P2(fx, fy) of each of the four different sets of spatial frequencies fx, fy are calculated.

In step S208, an amplitude ratio A1/A2=cA(fx, fy) representing the ratio obtained by dividing the amplitude A1(fx, fy) of the spatial frequency of image 1 by the amplitude A2(fx, fy) of the spatial frequency of image 2 is calculated for each frequency. In addition, a phase difference P1−P2=dP(fx, fy) representing the difference between the phase P2(fx, fy) of the spatial frequency of image 2 and the corresponding phase P1(fx, fy) of the spatial frequency of image 1 is determined for each frequency (fx=1~4, fy=1~4).

In step S209, the position x of the pixel in the image along the horizontal direction is set to x+8. In step S210, it is judged as to whether or not the position x of the pixel along the horizontal direction indicates a value exceeding the maximum value Xmax representing the number of pixels in the image along the horizontal direction. If an affirmative judgement is made in step S210, the operation proceeds to step S211. In step S211, the position y of the pixel in the image along the vertical direction is set to y+8. In step S212, it is judged as to whether or not the position y of the pixel along the vertical direction indicates a value exceeding the maximum value Ymax representing the number of pixels in the image along the vertical direction. If an affirmative judgement is made in step S212, the operation proceeds to step S213.

If, on the other hand, it is judged in step S210 that the position x of the pixel along the horizontal direction indicates a value equal to or lower than the maximum value Xmax, the operation returns to step S201. In addition, if it is judged in step S212 that the position y of the pixel along the vertical direction indicates a value equal to or lower than the maximum value Ymax, the operation returns to step S201. Namely, the processing in steps S201~S208 is repeatedly executed by sequentially shifting the pixel data block corresponding to 8×8 pixels by 8 pixels at a time until the values indicating the pixel positions x and y in the image along the horizontal direction and the vertical direction become equal to or higher than the maximum values Xmax and Ymax respectively. As a result, the amplitude ratio cA(fx, fy) and the phase difference dP(fx, fy) of each frequency is obtained in each 8×8 pixel data block of the image data. It is to be noted that the amplitude ratio cA(fx, fy) and the phase difference dP(fx, fy) increase as the extent of the image blur manifesting in image 2 becomes larger relative to image 1.

Under normal circumstances, in a blurred image in which waves of various spatial frequency components are offset and overlap one another, the amplitude of the spatial frequency, and in particular, the amplitude of the high-frequency component, becomes smaller compared to the amplitude of the spatial frequency in a blur-free image and also, the phase of the blurred image changes as well. Image 1 obtained at a higher shutter speed achieves a sharper photographic image compared to image 2 obtained at a lower shutter speed. In other words, in the spatial frequency range, the frequency component in image 2 and in particular, the high-frequency component in image 2 are affected by the hand movement to a larger extent compared to those in image 1.

Accordingly, by correcting the spatial frequency component and more specifically, the high-frequency component in the blurred image 2 to the level of the spatial frequency in image 1 which is free of any blur, based upon the amplitude ratio cA(fx, fy) and the phase difference dP(fx, fy) it becomes possible to create a blur-free image. However, since image 1 is obtained through a shorter exposure time, its signal-to-noise ratio (SN ratio) is poor and thus, image 1 contains a great deal of noise. For this reason, the amplitude ratio cA(fx, fy) and the phase difference dP(fx, fy) calculated in step S208 using the data from image 1, too, contains significant noise. Consequently, the image achieved by correcting image 2 based upon the amplitude ratio cA and the phase difference dP will contain a great deal of noise as well.

Accordingly, in order to eliminate the adverse effect of noise, the amplitude ratio cA(fx, fy) and the phase differences dP(fx, fy) obtained in all the 8×8 pixel data blocks are averaged over the entire image. By correcting image 2 using the averaged noise-free amplitude ratio and phase difference, an image which does not contain any noise and has been corrected to eliminate any blur can be created.

In step S213, the average of the amplitude ratios cA(fx, fy) in all the pixel data blocks is calculated for each frequency. The average value thus calculated is designated as an average amplitude ratio AaV(fx, fy) for the entire image. In addition, the average of the phase differences dP(fx, fy) in all the pixel data blocks is calculated for each frequency. The average value thus calculated is designated as an average phase difference PaV(fx, fy) for the entire image. Then, the operation proceeds to step S214 in the flowchart presented in FIG. 6.

In step S214, the pixel positions along the horizontal direction and the vertical direction are initialized to x=9 and y=9 respectively. In step S215, image data D2(x, y)~D2(x+7, y+7) in a pixel data block corresponding to 8×8 pixels in the blurred image 2 undergo a spatial frequency analysis and the amplitude A2(fx, fy) and the phase P2(fx, fy) are calculated for each of the four sets of spatial frequencies fx, fy(fx=1~4, fy =1~4) as in step S207.

In step S216, an amplitude A3(fx, fy) is calculated for each frequency by multiplying the amplitude A2(fx, fy) calculated in step S215 by the corresponding average amplitude ratio AaV(fx, fy) calculated in step S213 (A2xAaV) In addition, a phase P3(fx, fy) is calculated for each frequency by advancing the phase P2(fx, fy) calculated in step S215 by the corresponding average phase difference PaV(fx, fy) calculated in step S213 (P2+PaV). The amplitude A3 and the phases P3 are calculated in this manner for the four sets of spatial frequency fx, fy(fx=1~4, fy=1~4).

In step S217, image data D3(x, y)~D3(x+7, y+7) of a blur-free image 3 are generated through an inverse Fourier transform or the like based upon the amplitude A3(fx, fy) and the phases P3(fx, fy) calculated in correspondence to the individual sets of frequencies in step S216.

In step S218, the position x of the pixel in the image along the horizontal direction is set to x+8. In step S219, it is judged as to whether or not the position x of the pixel along the horizontal direction indicates a value exceeding Xmax−8. If an affirmative judgement is made in step S219, the operation proceeds to step S220. In addition, in step S220, the position y of the pixel in the image along the vertical direction is set to y+8. In step S221, it is judged as to whether or not the position y of the pixel along the vertical direction indicates a value exceeding Ymax−8. If an affirmative judgement is made in step S221, the operation proceeds to step S222.

If, on the other hand, it is judged in step S219 that the position x of the pixel along the horizontal direction indicates a value equal to or lower than Xmax−8, the operation returns to step S215. In addition, if it is judged in step S221 that the position y of the pixel along the vertical direction indicates a value equal to or lower than Ymax−8, the operation returns to step S215. Namely, the processing in steps S215~S217 is repeatedly executed by sequentially shifting pixel data block corresponding to 8×8 pixels by 8 pixels at a time.

As a result, image data D3(x, y), ( x=9~Xmax−8, y=9~Ymax−8) of blur-free image 3 are calculated.

It is to be noted that no image blur correction is implemented in the periphery of image 2, i.e., in the areas expressed as x=1~8, Xmax−8~Xmax, y=1~8, Ymax−8~Ymax. There is a possibility that a background which is not contained in image 1 is included in the blocks corresponding to the entire periphery of image 2 (width:8 pixels), due to the shift between image 1 and image 2. For this reason, it is highly unlikely that an accurate image blur correction could be achieved simply through the image blur correction processing described above. Accordingly, in step S222, the data in the peripheral blocks in image 2 are transferred to image 3 without implementing the image blur correction processing on them. Image 3 is completed as a whole image in this manner, thereby completing the image blur correction processing.

Next, in step S223, it is judged in step S223 as to whether or not the maximum value of the pixel data D3(x, y) in image 3 exceeds 255, i.e., whether or not the data manifest a white-clipping with the JPEG 8-bit recording format or the like. If a negative judgement is made in step S223, i.e., if there are no data indicating a value exceeding 255, the processing ends at this point.

If, on the other hand, an affirmative judgement is made in step S223, i.e., if there are data indicating a value exceeding 255, the operation proceeds to step 224. In step S224, the file format is changed to, for instance, the JPEG 16-bit format. Namely, by increasing the quantifying bit number from 8 to 16, it becomes possible to reproduce the portion including a white-clipping which could not be reproduced at 8 bits.

In step S225, the gamma curve is adjusted (gradation correction processing) so that the data D3(x, y) of image 3 converted to the 16-bit format in step S224 can be correctly reproduced. In other words, the brightness data are compressed so that the dynamic range of the change occurring in the image brightness is contained within a specific range. It is to be noted that gamma curves should be set and stored in the ROM 26 or the like in advance As described above, image 1 and image 2 are each divided into a plurality of pixel data blocks (each corresponding to 8×8 pixels) in the blurred image correction processing in the first embodiment. The 4×4 sets of amplitude data and phase data with regard to the spatial frequencies in each pixel data block are calculated by shifting the pixel data block by 8 pixels at a time. The ratio of the amplitude data in image 1 and the corresponding set of amplitude data in image 2 and the difference between the phase data in image 1 and the corresponding phase data in image 2 are calculated for each pixel data block. The amplitude ratio data and the phase difference data are then averaged over the entire image, thereby calculating average amplitude ratio data and average phase difference data. Using the average amplitude ratio data and the average phase difference data, the amplitude data and the phase data of image 2 are then corrected. Based upon the corrected amplitude data and phase data, the data for a blur-free image 3 are restructured.

As a result, a blurred image can be corrected without employing an image blur correction optical system or a movement detector in the first embodiment of the present invention. Consequently, it becomes possible to miniaturize the digital camera and the image processing system and to minimize the extent of the increase in the production costs.

Since the image blur correction is implemented in the spatial frequency range based upon the two sets of image data obtained by performing exposure over varying lengths of time, an image blur occurring during the exposure operation can be corrected.

-Second Embodiment-

The basic structure of the digital camera achieved in the second embodiment is identical to the structure assumed in the first embodiment shown in FIGS. 1 and 2. In the second embodiment, blurred image correction processing is implemented by dividing an image into pixel data blocks corresponding to 16×16 pixels. The following is an explanation of the blurred image correction processing achieved in the second embodiment, given in reference to the flowchart presented in FIGS. 9 and 10. It is to be noted that the processing achieved in the second embodiment corresponds to that implemented in step S112 in the flowchart presented in FIG. 4 in reference to which the first embodiment has been explained earlier. The explanation below focuses on the difference from the first embodiment.

In step S300, the coordinate parameters x and y used to indicate the positions of the individual pixels of image 1 and the individual pixels of image 2 are initialized to 1.

In step S301, image data D1(x, y)~D1(x+15, y+15) in a pixel data block corresponding to 16×16 pixels are read out from image 1. In step S302, the values indicated by the image data D1(x, y)~D1(x+15, y+15) read out in step S301 are individually multiplied by 2. As in step S203, it is judged in step S303 as to whether any image data in image 1 manifest a white-clipping (a value equal to or higher than 200) or a black-clipping (a value equal to or lower than 50). If it is judged in step S303 that the image data do not manifest a white-clipping or a black-clipping, the operation proceeds to step S304.

In step S304, image data D2(x, y)~D2(x+15, y+15) in a pixel data block corresponding to 16×16 pixels are read out from image 2. As in step S303, the image data from image 2 are checked for any white-clippings or black-clippings in step S305. If it is judged in step S305 that the image data do not manifest any white-clippings or black-clippings, the operation proceeds to step S306.

If, on the other hand, it is judged either in step S303 or step S305 that the image data manifest a white-clipping or black-clipping, the operation proceeds to step S309.

The processing performed in steps S306~S308 is essentially identical to that implemented in steps S206~S208 in the flowchart presented in FIG. 5 in reference to which the first embodiment has been explained earlier. In step S306, eight different sets of spatial frequencies fx, fy(fx=1~8, fy=1~8) representing 16-pixel~2-pixel periods are obtained along both the vertical direction and the horizontal direction for each image data block D1(x, y)~D1(x+15, y+15). Then, the amplitude A1(fx, fy) and the phase P1(fx, fy) of each spatial frequency (fx, fy) are calculated. In step S307, the amplitudes A2(fx, fy) and the phases P2(fx, fy) of the eight sets of spatial frequencies fx, fy are calculated for the image data block D2(x, y)~D2(x+15, y+15) in image 2. In step S308, the amplitude ratio A1/A2=cA(fx, fy) and the phase difference P1−P2=dP(fx, fy) are determined for each frequency (fx=1~8, fy=1~8).

In the following steps S309~S312, the pixel data block corresponding to 16×16 pixels is shifted by 8 pixels along both the vertical direction and the horizontal direction and it is judged as to whether or not x and y have exceeded the maximum values Xmax and Ymax representing the number of pixels provided along the corresponding directions. The processing in steps S301~S308 is repeatedly executed until x and y exceed the maximum values Xmax and Ymax respectively. As a result, the amplitude ratios cA(fx, fy) and the phase differences dP(fx, fy) are calculated for each of the pixel data blocks corresponding to 16×16 pixels shifted from each other by 8 pixels.

In step S313, average amplitude ratios cA(fx, fy) and average phase differences Pav (fx, fy) are calculated based upon the amplitude ratios cA(fx, fy) and the phase differences dP(fx, fy). Then, the operation proceeds to step S314 in FIG. 10.

In step S314, x and y are initialized to x=5 and y=5.

The processing performed in steps S315~S317 is essentially identical to the processing implemented in steps S215~S217 in FIG. 6 in reference to which the first embodiment has been explained. In step S315, the amplitudes A2 (fx, fy) and the phases P2(fx, fy) corresponding to the eight different sets of spatial frequencies are calculated by using image data D2(x, y)~D2(x+15, y+15) of the blurred image 2. In step S316, an amplitude A3(fx, fy)=A2(fx, fy)×AaV (fx, fy) and a phase P3(fx, fy)=P2(fx, fy)+Pav(fx, fy) are calculated for each spatial frequency.

In step S317, based upon the amplitudes A3(fx, fy) and the phases P3(fx, fy) calculated in step S316, image data D3(x+4, y+4)~D3(x+11, y+11) in a pixel data block corresponding to 8×8 pixels are created for a blur-free image 3.

In the following steps S318~S321, it is judged as to whether or not x and y have exceeded Xmax−8 and Ymax−8 by shifting the pixel data block corresponding to 16×16 pixels by 8 pixels along the vertical direction and the horizontal direction. The processing in steps S315~S317 is executed repeatedly until x and y exceed Xmax−8 and Ymax−8 respectively. As a result, image data D3(x, y) (x=5~Xmax−4, Y=5~Ymax−4) for image 3, in which an image blur has been corrected, are obtained.

Instep S322, the image data in the blocks over a 4-pixel width around the entire periphery of image 3 are obtained by transferring the corresponding image data from image 2 to image 3, thereby completing the blurred image correction processing.

As explained above in reference to FIGS. 9 and 10, in the blurred image correction processing achieved in the second embodiment, image 1 and image 2 are each divided into pixel data blocks corresponding to 16×16 pixels and 8×8 sets of amplitude data and phase data are calculated by shifting the pixel data block corresponding to 16×16 pixels by 8 pixels at a time. Then, using the average amplitude ratio data and the average phase difference data, the 8×8 sets of amplitude data and phase data are corrected while shifting the pixel data block corresponding to 16×16 pixels of image 2 by 8 pixels at a time. Based upon the corrected amplitude data and phase data, a pixel data block corresponding to 8×8 pixels is generated for the blur-free image 3, and thus, image 3 is sequentially restructured.

By increasing the size of the image data blocks, it becomes possible to achieve an image blur correction on an image manifesting significant blurring. Furthermore, an improvement is achieved in the suppression of noise contained in image data.

-Third Embodiment-

Figure 11:
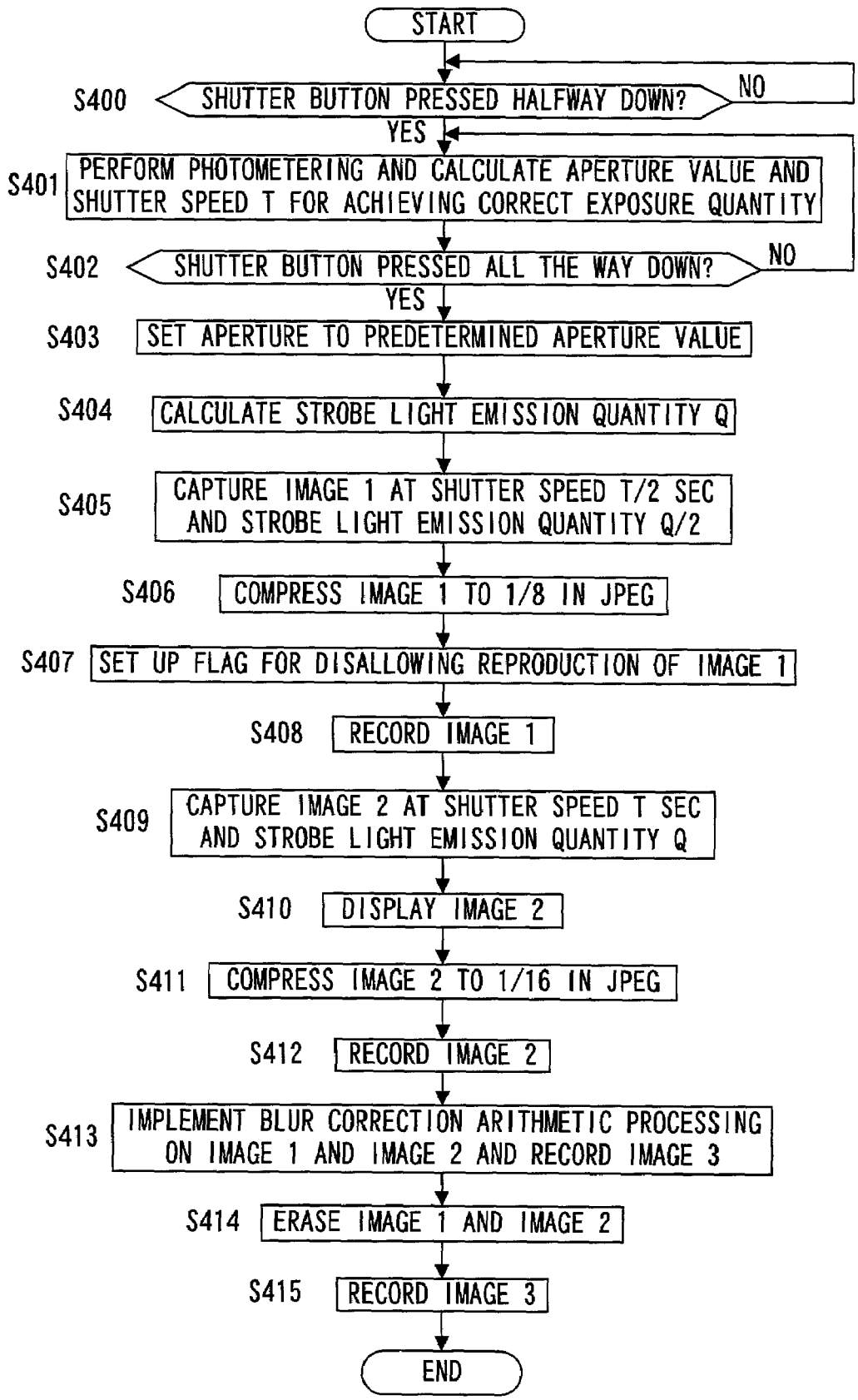
FIG. 11 presents a flowchart of the processing implemented in conformance to a blurred image correction processing program in the CPU and the DSP in a third embodiment of the present invention.

An explanation has been given in reference to the first and second embodiments above by assuming that the image blur correction is implemented without emitting light at the strobe unit 5 when performing photographing operation. An explanation is now given in reference to the third embodiment on image blur correction control implemented during a flash photographing operation. FIG. 11 presents a flowchart of the procedure of image blur correction control processing implemented when light is emitted at the strobe unit 5. It is to be noted that the explanation given in reference to the third embodiment focuses on the difference from the first and second embodiments.

Since the processing performed in steps S400~S403 is identical to the processing in steps S100~S103 in FIG. 4, its explanation is omitted.

Figure 12:
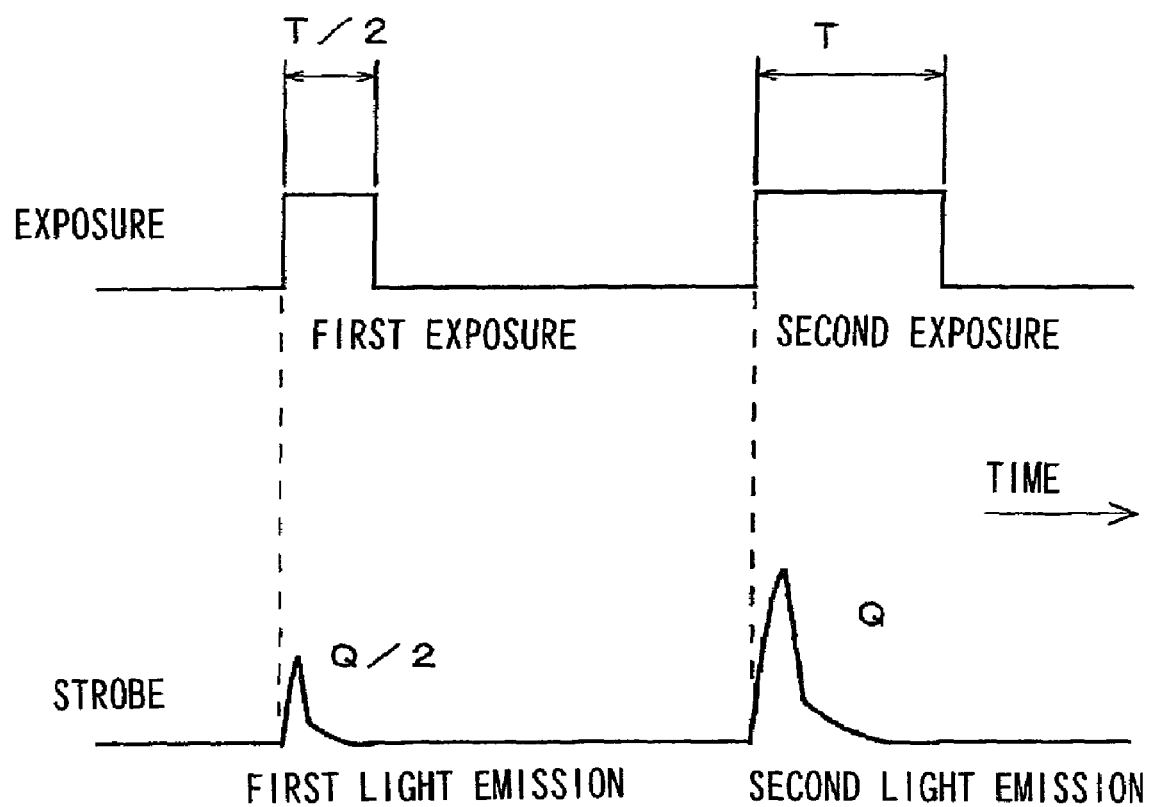
FIG. 12 is an operation time chart of the exposure and the strobe light emission implemented in a digital camera.

In step S404, the quantity Q of light to be emitted at the strobe unit 5 is calculated in correspondence to the photographing distance, the aperture value, the subject brightness and the like. In step S405, a subject image is exposed and captured at the CCD 20 by driving the step motor 14 and thus engaging the shutter 15 in operation over an exposure time (shutter speed) T/2 which is half of the exposure time T calculated in step S401. The quantity of light emitted at the strobe at this time is Q/2, i.e., half the light emission quantity Q determined in step S404, as shown in FIG. 12. The image obtained through this image-capturing operation is referred to as image 1.

Since the processing implemented in the following steps S406~408 is identical to that in steps S105~S107 in FIG. 4, its explanation is omitted.

In step S409, a subject image is captured at the CCD 20 at the aperture value and over the exposure time T set in step S401. The quantity of light emitted at the strobe at this point equals the light emission quantity Q determined in step S404, as shown in FIG. 12. The image obtained through this image-capturing operation is referred to as image 2.

Since the processing implemented in the following steps S410~415 is identical to that in steps S109~S114 in FIG. 4, its explanation is omitted.

As explained above, the strobe light emission quantities achieved during individual exposure operations are set in proportion to the lengths of exposure times when implementing an image blur correction through image processing by comparing the spatial frequency components of images obtained through different exposure times in the third embodiment. As a result, the overall exposure quantity level of each image is made to correspond to the length of the exposure time, thereby making it possible to execute the processing for comparing the spatial frequency components to achieve the image blur correction with greater ease. When the slow synchronize mode or the like in which the shutter speed is lowered is set, in particular, a highly effective image blur correction can be achieved.

An explanation is given in reference to the third embodiment above on an example in which an image blur correction is implemented by invariably performing a plurality of exposure operations (image-capturing operations) during the flash light emission. However, the present invention is not limited to these particulars, and a plurality of exposure operations (image-capturing operations) may be performed only when the slow synchronize mode, in which the shutter speed (exposure time) is relatively long is set at the strobe mode setting member 43, since an image blur tends to occur more readily as the exposure time becomes longer.

-Fourth Embodimentthe fourth embodiment of the present invention, it is judged as to whether or not an image blur has occurred based upon image data of a plurality of images captured over varying exposure times and image processing for image blur correction is executed only when it is judged that an image blur has occurred. In addition, when a photographing operation is performed by panning the camera, the image processing for image blur correction is optimized in correspondence to the panning direction. The following is an explanation of the image blur correction control achieved in the fourth embodiment, given in reference to drawings. It is to be noted that the basic structure of the digital camera 1 achieved in the fourth embodiment is identical to that assumed in the first embodiment shown in FIGS. 1~3. The explanation given below focuses on the difference from the first~third embodiments explained earlier.

Figure 13:
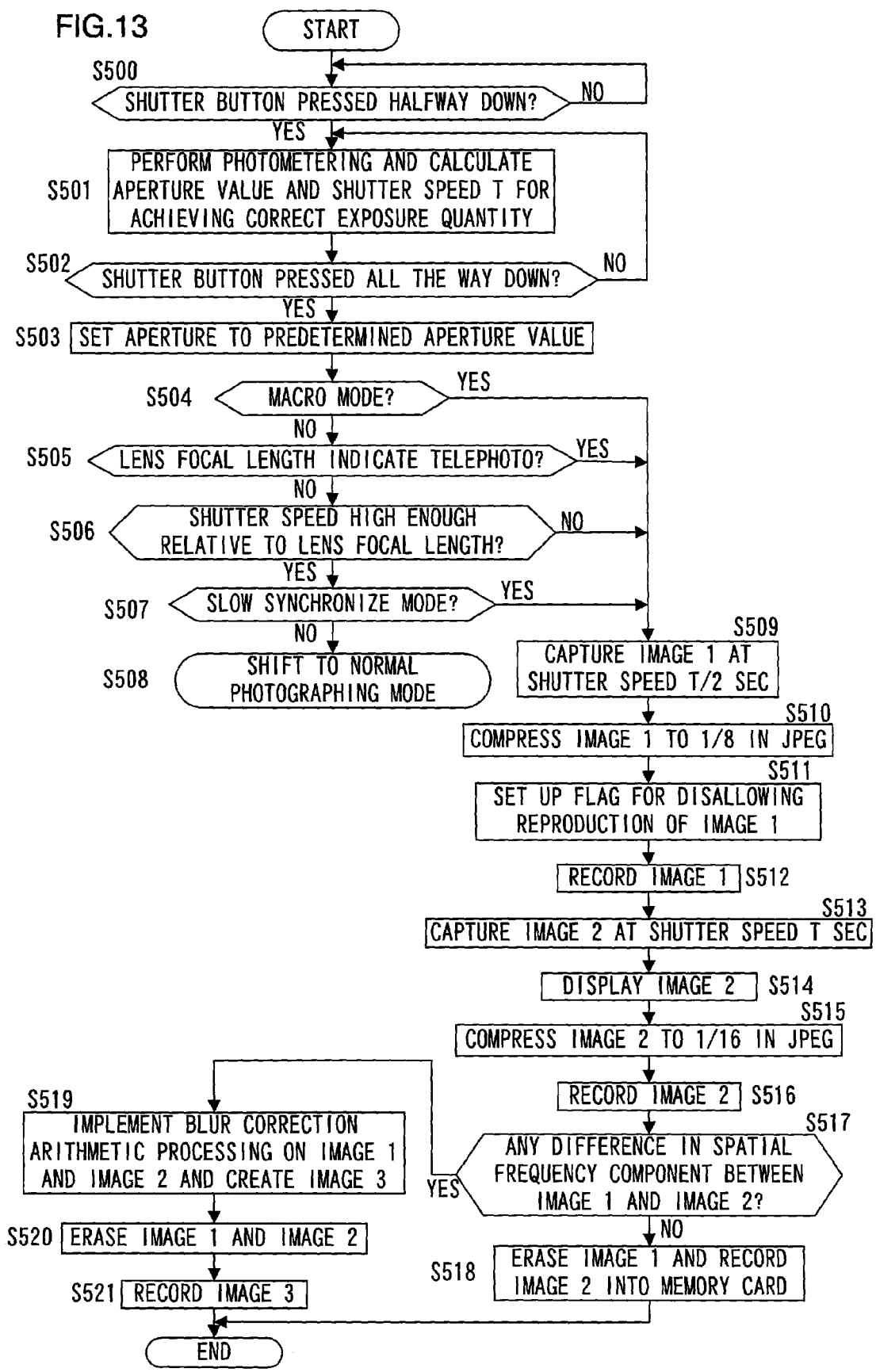
FIG. 13 presents a flowchart of the processing implemented in conformance to a blurred image correction processing program in the CPU and the DSP in a fourth embodiment of the present invention.

FIG. 13 presents a flowchart of the procedure of the image blur correction control processing implemented in the CPU 10 and the DSP 21 in the fourth embodiment. The blur correction selecting member 42 is set to indicate that a blur correction is to be executed and the panning direction setting member 41 and the strobe mode setting member 43 are set as the photographer sees fit. This processing starts as the power to the digital camera 1 is turned on.

In step S500, it is judged as to whether or not the shutter release button 3 has been pressed halfway down. If an affirmative judgement is made in step S500, the operation proceeds to step S501. In step S501, the subject light is metered and the correct aperture value and the correct exposure time (shutter speed) T are calculated for performing an image-capturing operation.

In step S502, it is judged as to whether or not the shutter release button 3 has been pressed all the way down. If an affirmative judgement is made in step S502, the operation proceeds to step S503. In step S503, the aperture 18 is controlled to achieve the aperture value calculated in step S501 by driving the step motor 17.

In step S504, it is judged as to whether or not the macro mode for performing a close-up photographing operation has been set through the selector switch 40. The extent to which the adverse effect of a movement of the subject or an unsteady hand movement of the camera manifests in close-up photographing is greater than that in a normal photographing operation, i.e., a photographing operation performed without getting very close to the subject. Accordingly, if an affirmative judgement is made in step S504 that the macro mode has been selected, the operation proceeds to step S509 to execute image blur correction processing. If, on the other hand, a negative judgement is made in step S504, the operation proceeds to step S505.

In step S505, focal length data are read out via the focal length detection circuit 44 to judge as to whether or not the focal length of the photographic lens 2 indicates that the photographic lens 2 is a telephoto lens. For instance, if the focal length of the photographic lens 2 is equal to or larger than 100 mm, the photographic lens 2 may be determined to be a telephoto lens. Since the adverse effect of a subject movement or an unsteady hand movement of the camera manifests to a larger extent in a photographing operation performed with a telephoto lens compared to an operation performed with a lens with a smaller focal length, the operation proceeds to step S509 to implement blur correction control. If, on the other hand, a negative judgement is made in step S505 that the photographic lens 2 is not a telephoto lens, the operation proceeds to step S506.

In step S506, it is judged as to whether or not the shutter speed T set in step S501 is high enough relative to the focal length of the photographic lens 2. For instance, it may be judged that the shutter speed T is sufficiently high relative to the focal length of the photographic lens 2 when the shutter speed T is higher than 1/f with f representing the focal length. If the shutter speed T is low, the adverse effect of a subject movement or an unsteady movement of the camera manifests to a larger extent compared to that manifesting when the shutter speed is higher, and thus, the up operation proceeds to step S509 to implement image blur correction control. If a negative judgement is made in step S506 that the shutter speed is high, the operation proceeds to step S507.

In step S507, it is judged as to whether or not the slow synchronize mode has been selected for the strobe mode. If the slow synchronize mode has been selected, the restrictions on the shutter speed on the low speed side have been cleared and thus, the adverse effect of a subject movement or an unsteady movement of the camera manifests to a large extent. Accordingly, the operation proceeds to step S509 to implement image blur correction control. If, on the other hand, a negative judgement is made in step S509 that the slow synchronize mode has not been selected, the operation proceeds to step S508 to shift to the normal photographing mode. It is to be noted that since no image blur correction control is implemented in the normal photographing mode and the normal photographing mode thus does not bear any reference to the present invention, its explanation is omitted.

The processing implemented in the following steps S509~S516 is identical to the processing in steps S104~S111 in FIG. 4 corresponding to the first embodiment, and for this reason, its explanation is omitted. It is to be noted that through this process, image 1 and image 2 captured over varying exposure times are obtained.

In step S517, it is judged as to whether or not there is a difference manifesting between the spatial frequency components of image 1 and image 2. For instance, MTFs (modulation transfer functions) of the spatial frequency ranges of image 1 and image 2 are ascertained through a Fourier transform. Then, the MTFs of image 1 and image 2 are compared to each other. If the MTF of image 2 is lower than the MTF of image 1 by a predetermined degree with regard to the high-frequency component, it is determined that the high-frequency component decreased due to an image blur. In such a case, an affirmative judgement is made in step S517 and the operation proceeds to step S519 to engage in the blurred image correction processing. If, on the other hand, the MTF of image 2 is not lower by the predetermined extent than the MTF of image 1 with regard to the high-frequency component, a negative judgement is made in step S517 and the operation proceeds to step S518 by assuming that the blurred image correction processing is not necessary.

In step S518, image 1 stored in the buffer memory 30 is erased and image 2 is recorded into the memory card 25.

In step S519, image 3, in which the blur has been corrected, is generated using image 1 and image 2 through the blurred image correction processing. Details of the image processing performed in step S519 are to be given later.

In step S520, image 1 and image 2 are both erased from the buffer memory 30. In step S521, the blur-free image 3 created in step S519 is recorded in the memory card 25 before the processing ends.

Figure 14:
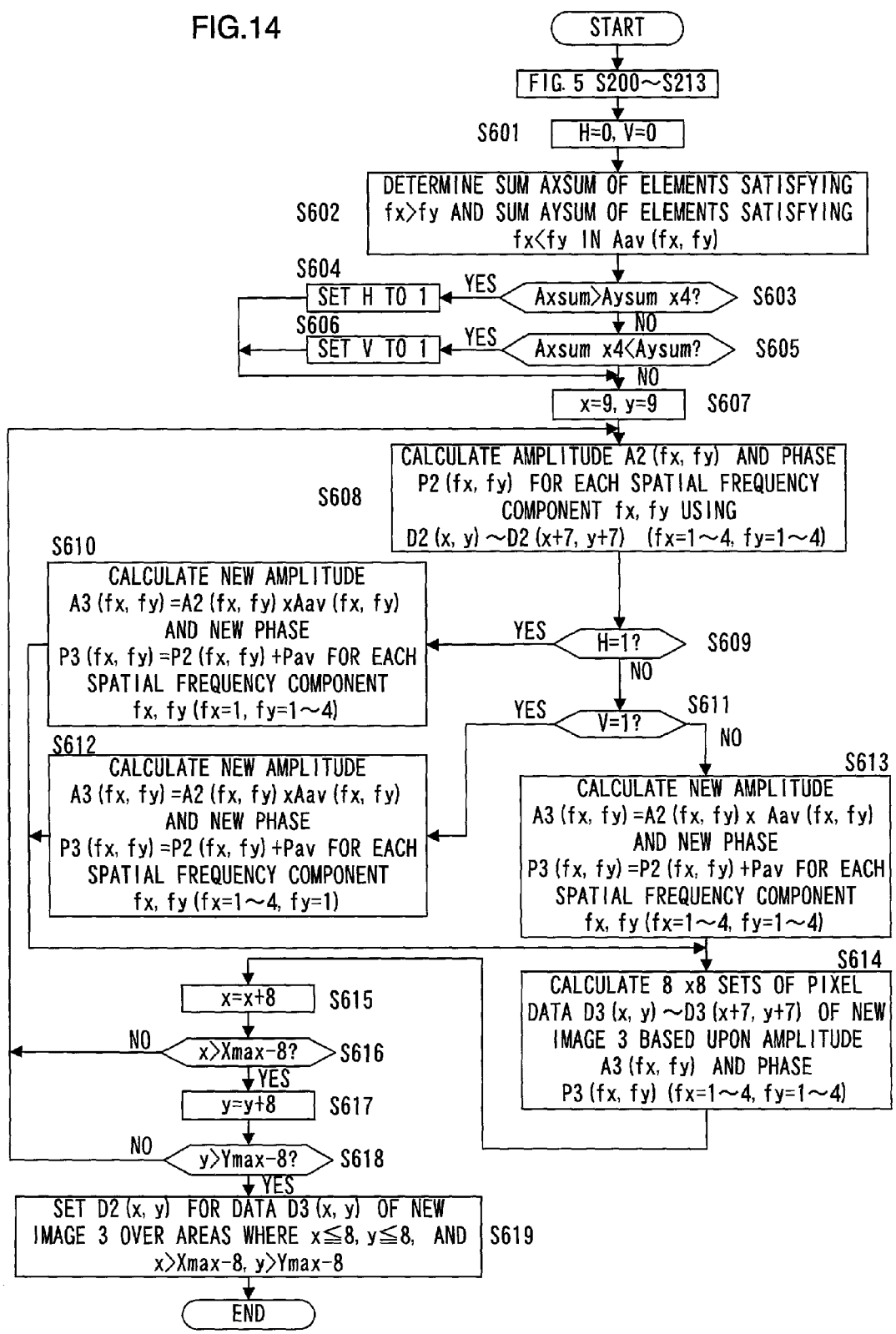
FIG. 14 presents a flowchart of a blurred image correction processing procedure.

Next, the blurred image correction processing implemented in step S519 in the flowchart in FIG. 3 described above, i.e., the processing for creating image 3, is explained in reference to the flowchart in FIG. 14. Since the processing in the first half of the flowchart in FIG. 14 is identical to the processing performed in steps S200~S213 in the flowchart in FIG. 5 in reference to which the first embodiment has been explained, its explanation is omitted. It is to be noted that this blurred image correction processing is executed by the DSP 21.

In step S601, a horizontal panning flag H and a vertical panning flag V are both initialized to 0.

In step S602, the sum total Axsum of the constituents satisfying fx>fy and the sum total Aysum of the constituents satisfying fy>fx among the constituents of the average amplitude ratios AaV(fx, fy) calculated in step S213 are calculated. Axsum and Aysum calculated through this operation respectively correspond to the extents of the image blur manifesting along the x direction (the horizontal direction of the image) and along the y direction (the vertical direction of the image) The larger the values of Axsum and Aysum, the larger the extents of the image blur manifesting along the x direction and the y direction.

In step S603, it is judged as to whether or not Axsum>Aysum×4. If the extent of the image blur Axsum along the x direction (the horizontal direction) is larger than the value obtained by multiplying the extent of the image blur Aysum along the y direction (the vertical direction) by a factor of 4, it is judged that a horizontal panning operation is currently performed by panning the camera along the x direction on purpose resulting in the increased extent of blurring along the x direction. In such a case, an affirmative judgement is made in step S603 and the operation proceeds to step S604. In step S604, 1 is set at the horizontal panning flag H and then the operation proceeds to step S607. If, on the other hand, a negative judgement is made in step S603, the operation proceeds to step S605.

In step S605, it is judged as to whether or not Aysum>Axsum×4. If the extent of the image blur Aysum along the y direction (the vertical direction) is larger than the value obtained by multiplying the extent of the image blur Axsum along the x direction (the horizontal direction) by a factor of 4, it is judged that a vertical panning operation is currently performed by panning the camera along the y direction on purpose resulting in the increased extent of blurring along the y direction. In such a case, an affirmative judgement is made in step S605 and the operation proceeds to step S606. In step S606, 1 is set at the vertical panning flag V and then the operation proceeds to step S607. If a negative judgement is made in step S605, the operation proceeds to step S607.

In step S607, x and y are initialized to x=9 and y=9. In step S608, a spatial frequency analysis is performed on the image data D2(x, y)~D2(x+7, y+7) in a pixel data block corresponding to 8×8 pixels of the blurred image 2 and the amplitudes A2(fx, fy) and the phases P2(fx, fy) of the four sets of spatial frequencies fx, fy(fx=1~4, fy=1~4) are calculated.

In step S609, it is judged as to whether or not 1 is currently set at the horizontal panning flag H. If an affirmative judgement is made in step S609, the operation proceeds to step S610. In step S610, an amplitude A3(fx, fy)=A2×AaV obtained by multiplying the amplitude A2(fx, fy) by a factor of AaV(fx, fy) and a phase P3(fx, fy)=P2+PaV obtained by advancing the phase P2(fx, fy) by PaV(fx, fy) are calculated for each of the frequency components whose frequency element fx along the x direction is 1 (a low-frequency component) and whose frequency component along the y direction is 1~4, in order to correct the image blur manifesting in image 2 primarily along the vertical direction (the y direction) Then, the operation proceeds to step S614.

In step S611, it is judged as to whether or not 1 is currently set at the vertical panning flag V. If an affirmative judgement is made in step S611, the operation proceeds to step S612. In step S612, an amplitude A3(fx, fy)=A2×AaV obtained by multiplying the amplitude A2(fx, fy) by a factor of AaV(fx, fy) and a phase P3(fx, fy)=P2+PaV obtained by advancing the phase P2(fx, fy) by PaV(fx, fy) are calculated for each of the frequency components whose frequency element fy along the y direction is 1 (a low-frequency component) and whose frequency component along the x direction is 1~4, in order to correct the image blur manifesting in image 2 primarily along the horizontal direction (the x direction) Then, the operation proceeds to step S614.

If a negative judgement made in step S611, it is assumed that a panning operation is not in progress with the horizontal panning flag H set to 0 and the vertical panning flag V also set to 0 and the operation proceeds to step S613. In step S613, an amplitude A3(fx, fy)=A2×AaV obtained by multiplying the amplitude A2(fx, fy) by a factor of AaV(fx, fy) and a phase P3(fx, fy)=P2+PaV obtained by advancing the phase P2(fx, fy) by PaV(fx, fy) are calculated for each of the frequency components whose frequency component fy along the y direction and whose frequency component along the x direction are 1~4.

In step S614, based upon the amplitude A3(fx, fy) and the phase P3(fx, fy) calculated in step S610, step S612 or step S613, image data D3(x, y)~D3(x+7, y+7) for image 3 are created.

In the following steps S615~S618, the pixel data block corresponding to 8×8 pixels is shifted by 8 pixels both along the vertical direction and the horizontal direction and it is judged as to whether or not x and y exceed Xmax−8 and Ymax−8 respectively. The processing in steps S608~S614 is executed repeatedly until the values of x and y exceed Xmax−8 and Ymax−8 respectively. As a result, image data D3 for image 3, in which the blur has been corrected along the panning direction are obtained if a panning operation has been performed. If a panning operation has not been performed, image data D3(x, y), in which the image blur has been corrected without factoring in the direction are obtained (x=9~Xmax−8, y=9~Ymax−8).

In step S619, the data blocks over an 8-pixel width in the entire periphery of image 3 are obtained by transferring the corresponding image data from image 2 to image 3, before the blurred image correction processing ends.

Figure 15:
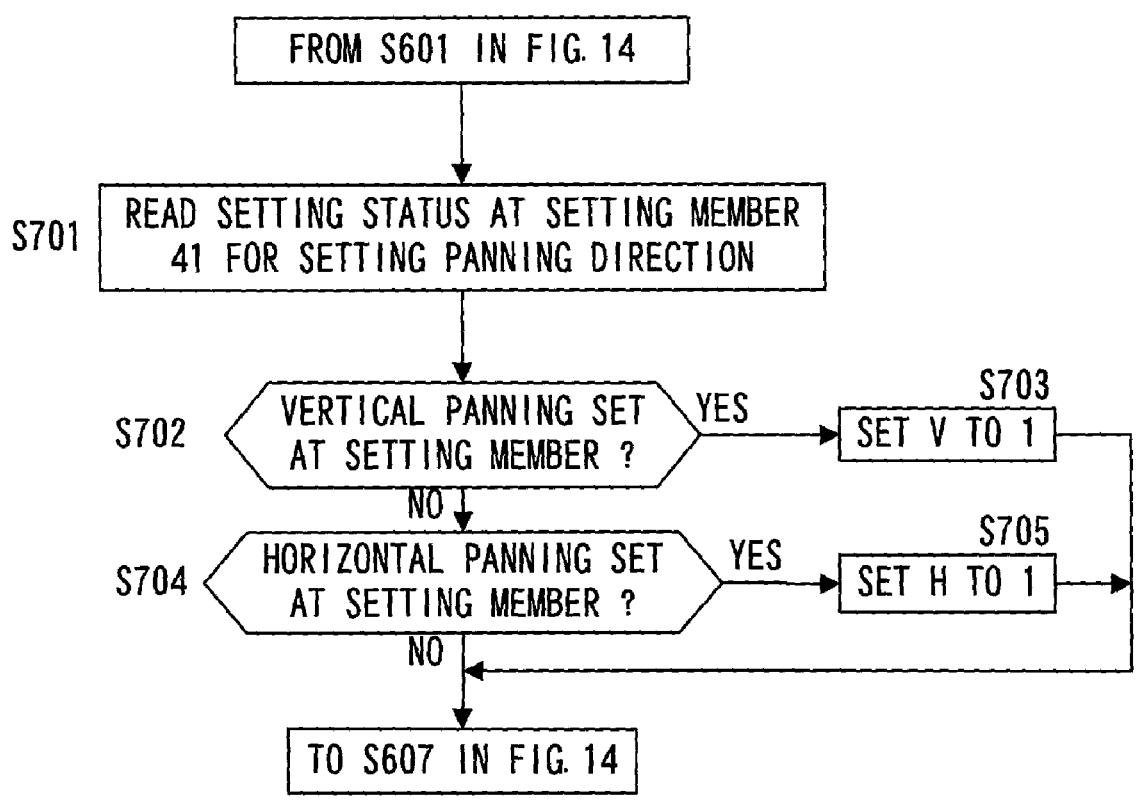
FIG. 15 presents a flowchart of a blurred image correction processing procedure, and more specifically, a flowchart of the decision-making processing with regard to the direction along which a panning operation is performed.

It is to be noted that while the panning direction is determined based upon the extent of blur Axsum along the horizontal direction and the extent of blur Aysum along the vertical direction in the processing in the flowchart in FIG. 14, the panning direction may be ascertained based upon the setting at the panning direction setting member 41, instead. FIG. 15 presents a flowchart of a panning direction decision-making procedure, which corresponds to the processing in steps S602~S606 in the flowchart in FIG. 14.

In step S701, the setting status of the panning direction setting member 41 is read.

In step S702, it is judged as to whether or not the panning direction setting member 41 is set to indicate a vertical panning operation. If an affirmative judgement is made in step S702, the operation proceeds to step S703. In step S703, 1 is set at the vertical panning flag V before the operation proceeds to step S607. If, on the other hand, a negative judgement is made in step S702, the operation proceeds to step S704.

In step S704, it is judged as to whether or not the setting at the panning direction setting member 41 indicates a horizontal panning operation. If an affirmative judgement is made in step S704, the operation proceeds to step S705. In step S705, 1 is set at the horizontal panning flag H before the operation proceeds to step S607. If a negative judgment is made in step S704, the operation proceeds to step S607.

By detecting the setting at the panning direction setting member 41, the panning direction can be ascertained with ease.

As described above, it is judged in the fourth embodiment as to whether or not an image blur has occurred based upon image data and since the image processing for an image blur correction is implemented only if it is judged that an image blur has occurred, an image blur can be corrected efficiently whenever necessary in addition to achieving the advantages of the preceding embodiments. In addition, if it is judged that no image blur has occurred, the processing is allowed to promptly shift to the next operation such as the photographing operation.

In addition, the panning direction along which the photographing operation is being performed by panning the camera is detected, and the image processing for the image blur correction is optimized in correspondence to the panning direction. As a result, a natural-looking panned image can be generated while implementing an image blur correction.

It is to be noted that the quantization bits may be changed and a gradation correction may be implemented based upon the brightness data of image 3 in the fourth embodiment, as in the first embodiment explained earlier.

Figure 16:
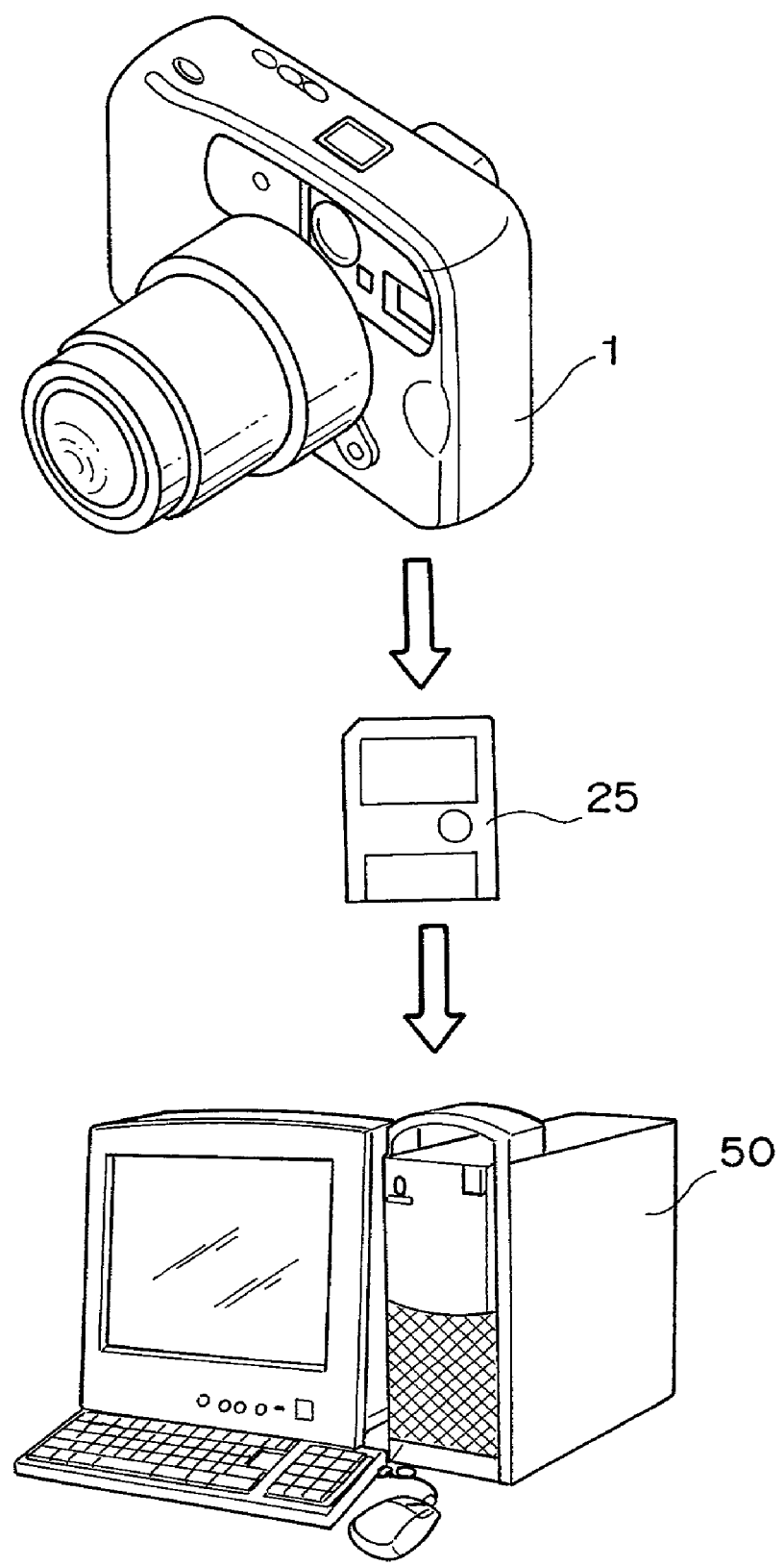
FIG. 16 shows the structure assumed in an embodiment of the image processing system according to the present invention.

-Fifth Embodimentthe first through fourth embodiments explained above, the image processing for an image blur correction is implemented in the digital camera 1. Now, in reference to the fifth embodiment, an image processing system comprising a digital camera 1 and an image processing apparatus 50 constituted of a personal computer and the like as shown in FIG. 16 is explained.

Image 1 and image 2 are captured in the digital camera 1 (steps S100~S111 in FIG. 4, steps S500~8516 in FIG. 13).

The image processing apparatus 50 takes in image 1 and image 2 via the memory card 25 or the like having recorded therein image 1 and image 2. The image processing apparatus 50 then creates image 3 in which the blur has been corrected based upon image 1 and image 2 that have been taken in (steps S112~S114 in FIG. 4, steps S517~S521 in FIG. 13).

In the image processing system described above, the image processing apparatus 50 achieving a high processing capability which is provided outside the digital camera 1 can be engaged in the heavy processing for blurred image correction involving a large volume of arithmetic operations. Thus, the digital camera 1, which can be dedicated to the photographing operation is able to perform operations such as a high-speed continuous shooting operation. In addition, it becomes possible to implement more advanced blurred image correction processing at high speed in the image processing apparatus 50.

The above described embodiments are examples and various modifications can be made without departing from the spirit and scope of the invention.

While the first image is obtained prior to the acquisition of the second image in the embodiments explained above, the second image may be obtained first, instead.

In the embodiments described above, the blurred image correction processing is implemented by analyzing the second image captured over the correct exposure time and the first image captured over an exposure which is half the correct exposure time in the spatial frequency range. However, the length of time for exposing the first image only must be shorter than the exposure time for the second image. It is desirable that the exposure time of the first image is equal to or less than approximately ½ of the exposure time of the second image to ensure that no image blur occurs in the first image. In addition, the length of exposure time for the second image does not need to be exactly correct, and the second image only needs to be obtained through exposure performed over a length of time long enough to allow an unsteady movement of the camera or a movement of the subject to affect the image.

In the embodiments explained above, the blurred image correction processing is implemented by analyzing two images captured over two different exposure times in the spatial frequency range. Instead, blurred image correction processing may be implemented by using more than two images obtained over varying exposure times to further lessen the extent of the adverse effect of image noise.

In the embodiments described above, the third image is created by implementing the blurred image correction processing immediately after recording the first image and second image. However, the third image may be generated by implementing the blurred image correction processing when a longer period of time has elapsed after recording the first image and the second image, instead. In this case, since the blurred image correction processing, which places a great onus on the digital camera, is implemented later, it becomes possible to continuously shoot and record images at high speed. The blurred image correction processing on the photographed image data may be implemented in such a case in response to, for instance, a specific operation by the user.

In the embodiments described above, the exposure time is controlled through a mechanical shutter operation. Instead, the exposure time may be controlled through an electronic shutter function of the image-capturing element.

In the embodiments described above, it is judged as to whether or not an image blur has occurred by comparing the spatial frequency components in the first image data and the second image data. However, the presence/absence of image blur may be determined by using the spatial frequency component of a single type of image data. Under normal circumstances, if blurring occurs in image data due to an unsteady hand movement, a subject movement or defocusing, the image data become smoothed to result in a loss of the spatial frequency component in the higher range. Accordingly, by comparing the high-frequency component in the spatial frequency range against a predetermined value, it can be judged as to whether or not an image blur has occurred.

In addition, the presence/absence of an image blur can be ascertained based upon the compressed code volume of the spatial frequency component in image data. It can be judged under normal circumstances that the larger the compressed code volume, the smaller the compression rate and the larger the high-frequency component in the spatial frequency range. Accordingly, by comparing the compressed code volume with a predetermined value, it can be ascertained whether or not an image blur has occurred. Since the value indicating the compressed code volume can be obtained as a result of the image compression processing, it is not necessary to implement additional processing in order to detect the compressed code volume Alternatively, a simplified value of the spatial frequency component may be calculated by utilizing a spatial frequency filter of the known art (e.g., a high pass filter which distinguishes differences manifesting among adjacent pixels) or through contrast detection, to ascertain whether or not an image blur has occurred.

In the embodiments described above, the spatial frequency components of the image data obtained over a longer exposure time are corrected by using the amplitude ratio data and the phase difference data to create a blur-free image based upon the two sets of image data obtained over varying exposure times. However, the image processing implemented to generate a blur-free image is not limited to this. For instance, an image that does not manifest a great extent of blurring may be obtained simply by amplifying the high-frequency component of image data manifesting a blur.

In the embodiment explained earlier, image data for a more natural-looking panned image are obtained by implementing image blur correction processing on the spatial frequency component along the direction perpendicular to the panning direction. However, the image processing may be performed by adopting a method other than this, as long as the image blur correction is executed while leaving intact the sense of the texture of the panned image. For instance, image processing in which the image data are high pass filtered only along the direction set in correspondence to the panning direction may be implemented instead.

Moreover, while the blur correction processing is implemented in the fourth embodiment by detecting the operating environment in which the digital camera is operated, detecting the blur manifesting in image 2 and also detecting the panning direction, the present invention is not restricted by these particulars. For instance, blur correction processing may be implemented if it is judged that image 2 manifests a larger extent of blurring than image 1 without detecting the digital camera operating environment (the macro mode, the lens focal length, etc.). In such a case, the processing in steps S504~S508 in the flowchart in FIG. 13 is omitted. In addition, blur correction processing may be implemented in correspondence to the panning direction if it is judged that a panning operation has been performed without making a decision as to whether or not image 2 manifests a blur In this case, the processing in steps S517 and S518 in the flowchart in FIG. 13 is omitted.

What is claimed is:

1. A digital camera comprising:
   an image-capturing device that captures a subject image;
   an exposure control device that implements control on a length of exposure time to elapse while capturing the subject image at said image-capturing device;
   an image generating device that generates a plurality of sets of image data through successive image-capturing operations performed over varying exposure times by controlling said image-capturing device and said exposure control device, the exposure times being different from one another; and
   an image processing device that generates image data in which the blur has been corrected by implementing image processing based upon the plurality of sets of image data generated by said image generating device, wherein:
   said image generating device successively generates first image data by capturing an image over a first exposure time and second image data by capturing an image over a second exposure time set longer than the first exposure time, a high-frequency component of an entire spatial frequency spectrum of the second image data being less than a high-frequency component of an entire spatial frequency spectrum of the first image data; and
   said image processing device generates third image data in which the blur has been corrected by correcting at least the high-frequency component of the spatial frequency contained in the second image data based upon the first image data and the second image data generated by said image generating device.

2. A digital camera according to claim 1, wherein:
   said exposure control device implements control so that the first exposure time is set equal to or less than approximately ½ of the second exposure time.

3. A digital camera according to claim 1, further comprising:
   an image compression device that compresses the first image data at a first compression rate and compresses the second image data at a second compression rate higher than the first compression rate; and
   a recording device that records the first image data and the second image data having been compressed at said image compression device.

4. A digital camera according to claim 1, further comprising:
   a display control device that allows the second image data to be displayed at a display unit and disallows display of the first image data at the display unit.

5. A digital camera according to claim 1, wherein:
   said image processing device generates the third image data by correcting an amplitude and a phase of a spatial frequency component of the second image data based upon an amplitude ratio and a phase difference of the spatial frequency component of the first image data and the spatial frequency component of the second image data.

6. A digital camera according to claim 1, wherein:
   said image processing device divides both the first image data and the second image data into pixel data blocks each containing pixel data corresponding to a predetermined number of pixels, calculates an amplitude ratio and a phase difference of a spatial frequency component of the first image data and the spatial frequency component of the second image data in each pixel data block for each frequency, calculates an average amplitude ratio and an average phase difference of the spatial frequency components of the first image data and the second image data by averaging amplitude ratios and phase differences of the spatial frequency components in individual pixel data blocks that have been calculated and generates the third image data by correcting the amplitude and the phase of the spatial frequency component of the second image data based upon the average amplitude ratio and the average phase difference thus calculated.

7. A digital camera according to claim 1, wherein:
   said image processing device implements gradation correction processing on the third image data if the third image data that have been generated contain brightness data indicating a value equal to or higher than a predetermined value.

8. A digital camera according to claim 1, wherein:
   said image processing device implements processing the third image data to increase a quantifying bit number thereof if the third image data having been quantized at a predetermined quantifying bit number contain brightness data indicating a value equal to or higher than a predetermined value.

9. A digital camera according to claim 1, further comprising:
   a flash control device that controls a flash light emitting unit to illuminate a subject at light emission quantities in proportion to varying exposure times when generating a plurality of sets of image data over the varying exposure times at said image generating device.

10. A digital camera according to claim 1, further comprising:
    a blur detection device that detects a blur manifesting in image data based upon a plurality of sets of image data generated at said image generating device, wherein:
    said image processing device records one set of image data among said plurality of sets of image data into a recording medium without implementing image processing for blur correction if the detection results obtained at said blur detection device indicate that none of the plurality of sets of image data manifest a blur, and executes image processing for blur correction if a blur has occurred in one of the plurality of sets of image data and records image data obtained by correcting the blur into the recording medium.

11. A digital camera according to claim 1, further comprising:
a blur detection device that detects a blur manifesting in the second image data based upon the first image data and the second image data generated at said image generating device, wherein:
said image processing device records the second image data into a recording medium without implementing image processing for blur correction if the detection results obtained at said blur detection device indicate that the second image data do not manifest any blur, and executes image processing for blur correction if a blur has manifested in the second image data and records third image data obtained by correcting the blur into the recording medium.

12. A digital camera according to claim 1, further comprising:
a panning direction setting unit through which a panning direction along which the second image data are captured is set, wherein:
said image processing device changes details of image processing implemented to generate the third image data in correspondence to the panning direction set at said panning direction setting unit.

13. A digital camera according to claim 12, wherein:
said image processing device generates the third image data primarily by correcting a spatial frequency component along a vertical direction contained in the second image data if horizontal panning is set at said panning direction setting unit, and generates the third image data primarily by correcting a spatial frequency component along the horizontal direction contained in the second image data if vertical panning is set at said panning direction setting unit.

14. A digital camera according to claim 1, further comprising:
a panning direction detection unit that detects a panning direction along which the second image data are captured, wherein:
said image processing device changes details of image processing implemented to generate the third image data in correspondence to the panning direction detected by said panning direction detection unit.

15. A digital camera according to claim 14, wherein:
said image processing device generates the third image data primarily by correcting a spatial frequency component along a vertical direction contained in the second image data if horizontal panning is detected by said panning direction detection unit, and generates the third image data primarily by correcting a spatial frequency component along a horizontal direction contained in the second image data if vertical panning is detected at said panning direction detection unit.

16. A digital camera according to claim 11, wherein:
said exposure control device implements control so that the first exposure time is set equal to or less than approximately ½ of the second exposure time.

17. A digital camera according to claim 12, wherein:
said exposure control device implements control so that the first exposure time is set equal to or less than approximately ½ of the second exposure time.

18. A digital camera according to claim 14, wherein:
said exposure control device implements control so that the first exposure time is set equal to or less than approximately ½ of the second exposure time.

19. A digital camera according to claim 1, further comprising:
a detection unit that detects a photographing condition of said digital camera which manifests a blur in image data generated by said image generating device, wherein:
said image processing device executes image processing for blur correction only when said detection unit detects the photographing condition of said digital camera which manifests a blur in the image data.

20. An image processing system comprising:
a digital camera having an image-capturing device that captures a subject image, an exposure control device that controls the length of exposure time to elapse while capturing the subject image at said image-capturing device and an image generating device that engages said exposure control device and said image-capturing device to successively generate first image data by capturing an image over a first exposure time and second image data by capturing an image over a second exposure time set longer than the first exposure time, a high-frequency component of an entire spatial frequency spectrum of the second image data being less than a high-frequency component of an entire spatial frequency spectrum of the first image data; and
an image processing apparatus that generates third image data by correcting at least the high-frequency component of the spatial frequency contained in the second image data based upon the first image data and the second image data generated by said digital camera.

21. A digital camera according to claim 1, further comprising:
a first calculation device that obtains information relating to the spatial frequency of the first image data; and
a second calculation device that obtains information relating to the spatial frequency of the second image data, wherein:
the image processing device generates the third image data based on the information relating to the spatial frequency of the first image data and the information relating to the spatial frequency of the second image data.

22. A digital camera according to claim 21, wherein:
the first calculation device calculates the information relating to the spatial frequency in each of pixel data blocks each containing pixel data corresponding to a predetermined number of pixels in the first image data, and
the second calculation device calculates the information relating to the spatial frequency in each of pixel data blocks each containing pixel data corresponding to a predetermined number of pixels in the second image data.

23. A digital camera according to claim 21, wherein:
the first calculation device calculates amplitudes and phases of a plurality of spatial frequency components contained in the first image data as the information relating to the spatial frequency, and
the second calculation device calculates amplitudes and phases of a plurality of spatial frequency components contained in the second image data as the information relating to the spatial frequency.

24. A digital camera according to claim 21, wherein:
the image processing device generates the third image data by correcting an amplitude and a phase of a spatial frequency component of the second image data.

25. A digital camera according to claim 24, wherein:
the image processing device generates the third image data by correcting the amplitude and the phase of the spatial frequency component of the second image data based upon an amplitude ratio and a phase difference of a spatial frequency component of the first image data and the spatial frequency component of the second image data.

26. An image processing system comprising:
a digital camera having an image-capturing device that captures a subject image, an exposure control device that controls the length of exposure time to elapse while capturing the subject image at said image-capturing device and an image generating device that engages said exposure control device and said image-capturing device to successively generate first image data by capturing an image over a first exposure time and second image data by capturing an image over a second exposure time set longer than the first exposure time; and an image processing apparatus that detects a panning direction along which the second image data have been captured and generates third image data by correcting a spatial frequency component contained in the second image data in correspondence to the panning direction based upon the first image data and the second image data generated by said digital camera.

27. A digital camera comprising:
an image-capturing device that captures a subject image;
an exposure control device that implements control on a length of exposure time to elapse while capturing the subject image at said image-capturing device;
an image generating device that successively generates first image data by capturing an image over a first exposure time and second image data by capturing an image over a second exposure time set longer than the first exposure time;
an image processing device that generates third image data in which a blur is corrected by correcting at least a high-frequency component of a spatial frequency contained in the second image data based upon the first image data and the second image data generated by said image generating device;
an image compression device that compresses the first image data at a first compression rate and compresses the second image data at a second compression rate higher than the first compression rate;
a recording device that records the first image data and the second image data having been compressed at said image compression device into a recording medium; and
a display control device that allows the second image data to be displayed at a display unit and disallows display of the first image data at the display unit, wherein:
said exposure control device implements control so that the second exposure time is set to a length of time over which a correct exposure quantity that sets brightness of the image data to a correct level is achieved and so that the first exposure time is set equal to or less than approximately ½ of the second exposure time;
said image processing device divides both the first image data and the second image data into pixel data blocks each containing pixel data corresponding to a predetermined number of pixels, calculates an amplitude ratio and a phase difference of a spatial frequency component of the first image data and the spatial frequency component of the second image data in each pixel data block, calculates an average amplitude ratio and an average phase difference of the spatial frequency components of the first image data and the second image data by averaging amplitude ratios and phase differences of the spatial frequency components in individual pixel data blocks that have been calculated and generates the third image data by correcting the amplitude and the phase of the spatial frequency component of the second image data based upon the average amplitude ratio and the average phase difference thus calculated.

28. A digital camera comprising:
an image-capturing device that captures a subject image;
an exposure control device that implements control on a length of exposure time to elapse while capturing the subject image at said image-capturing device;
an image generating device that successively generates first image data by capturing an image over a first exposure time and second image data by capturing an image over a second exposure time set longer than the first exposure time;
an image processing device that generates third image data in which a blur is corrected by correcting at least a high-frequency component of a spatial frequency contained in the second image data based upon the first image data and the second image data generated by said image generating device;
an image compression device that compresses the first image data at a first compression rate and compresses the second image data at a second compression rate higher than the first compression rate;
a display control device that allows the second image data to be displayed at a display unit and disallows display of the first image data at the display unit, and
a blur detection device that detects the blur manifesting in the second image data based upon the first image data and the second image data generated at said image generating device, wherein:
said exposure control device implements control so that the second exposure time is set to a length of time over which a correct exposure quantity that sets brightness of the image data to a correct level is achieved and so that the first exposure time is set equal to or less than approximately ½ of the second exposure time; and
said image processing device records the second image data into a recording medium without implementing image processing for blur correction if detection results obtained at said blur detection device indicate that the second image data do not manifest any blur, whereas said image processing device divides both the first image data and the second image data into pixel each containing pixel data corresponding to a predetermined number of pixels, calculates an amplitude ratio and a phase difference of the spatial frequency component of the first image data and the spatial frequency component of the second image data in each pixel data block for each frequency, calculates an average amplitude ratio and an average phase difference of the spatial frequency components of the first image data and the second image data by averaging amplitude ratios and phase differences of spatial frequency components in individual pixel data blocks that have been calculated, generates the third image data by correcting the amplitude and the phase of the spatial frequency component of the second image data based upon the average amplitude ratio and the average phase difference thus calculated and records the third image data obtained by correcting the blur into the recording medium.

29. A digital camera according to claim 28, further comprising:

a panning direction detection unit that detects a panning direction along which the second image data are captured, wherein:

said image processing device generates the third image data primarily by correcting a spatial frequency component along a vertical direction contained in the second image data if horizontal panning is detected by said panning direction detection unit, and generates the third image data primarily by correcting the spatial frequency component along a horizontal direction contained in the second image data if vertical panning is detected by said panning direction detection unit.

* * * * *